(12) United States Patent
Kawasaki et al.

(10) Patent No.: US 9,556,962 B2
(45) Date of Patent: Jan. 31, 2017

(54) MULTI-DIRECTIONAL SELECTOR VALVE

(71) Applicant: TECHNO TAKATSUKI, CO. LTD, Osaka (JP)

(72) Inventors: Nozomu Kawasaki, Osaka (JP); Tomoyuki Morishita, Osaka (JP)

(73) Assignee: TECHNO TAKATSYKI, CO., LTD (JP)

(*) Notice: Subject to any disclaimer, the term of this patent is extended or adjusted under 35 U.S.C. 154(b) by 101 days.

(21) Appl. No.: 14/456,251

(22) Filed: Aug. 11, 2014

(65) Prior Publication Data

US 2015/0041007 A1 Feb. 12, 2015

(30) Foreign Application Priority Data

Aug. 12, 2013 (JP) ................................. 2013-167792
Jul. 24, 2014 (JP) ................................. 2014-150954

(51) Int. Cl.
| | |
|---|---|
| *F16K 11/22* | (2006.01) |
| *F16K 11/07* | (2006.01) |
| *F16K 31/524* | (2006.01) |

(52) U.S. Cl.
CPC ............ *F16K 11/0716* (2013.01); *F16K 11/22* (2013.01); *F16K 31/52416* (2013.01); *Y10T 137/85986* (2015.04); *Y10T 137/86501* (2015.04)

(58) Field of Classification Search
USPC ....... 137/868, 883; 123/90.6, 184.21, 184.38
See application file for complete search history.

(56) References Cited

U.S. PATENT DOCUMENTS

| | | | | |
|---|---|---|---|---|
| 1,327,311 A | * | 1/1920 | Chesnutt | ................. F01N 13/10 123/184.38 |
| 2,297,576 A | * | 9/1942 | Miller | ..................... F16K 11/22 137/868 |
| 2,539,221 A | | 1/1951 | Badeaux | |
| 3,353,554 A | * | 11/1967 | Ludkin | ................. F16K 11/166 137/595 |
| 4,846,138 A | | 7/1989 | Vallejos | |

(Continued)

FOREIGN PATENT DOCUMENTS

| | | |
|---|---|---|
| JP | 2001193663 | 7/2001 |
| JP | 2002250455 | 9/2002 |
| WO | 02061516 | 8/2002 |

OTHER PUBLICATIONS

European Search Report, Eurpoean Application No. 14180016, dated Jan. 23, 2015.

*Primary Examiner* — John Fox
(74) *Attorney, Agent, or Firm* — Perman & Green, LLP

(57) ABSTRACT

There is provided a multi-directional selector valve which makes it possible to control opening and closing of the discharge ports in an easy manner and to minimize increase in cost and size even if the number of branches is increased. The multi-directional selector valve includes a valve case provided with a suction port and at least two discharge ports, at least two valve bodies provided for opening or closing the at least two discharge ports, a drive body formed into a rod-like shape and provided for driving the valve bodies and a drive source for rotating the drive body, and is configured such that any of convex portions provided on the side of the drive body are pressed onto any of the at least two valve bodies by the rotation of the drive body, thereby opening or closing the at least two discharge port in order.

9 Claims, 18 Drawing Sheets

(56) References Cited

U.S. PATENT DOCUMENTS

| | | | | |
|---|---|---|---|---|
| 7,036,473 B1* | 5/2006 | Goracy | ................. | F01L 1/024 |
| | | | | 123/90.17 |
| 7,353,843 B2* | 4/2008 | Arrowood, Jr. | ....... | F16K 11/105 |
| | | | | 137/595 |

* cited by examiner

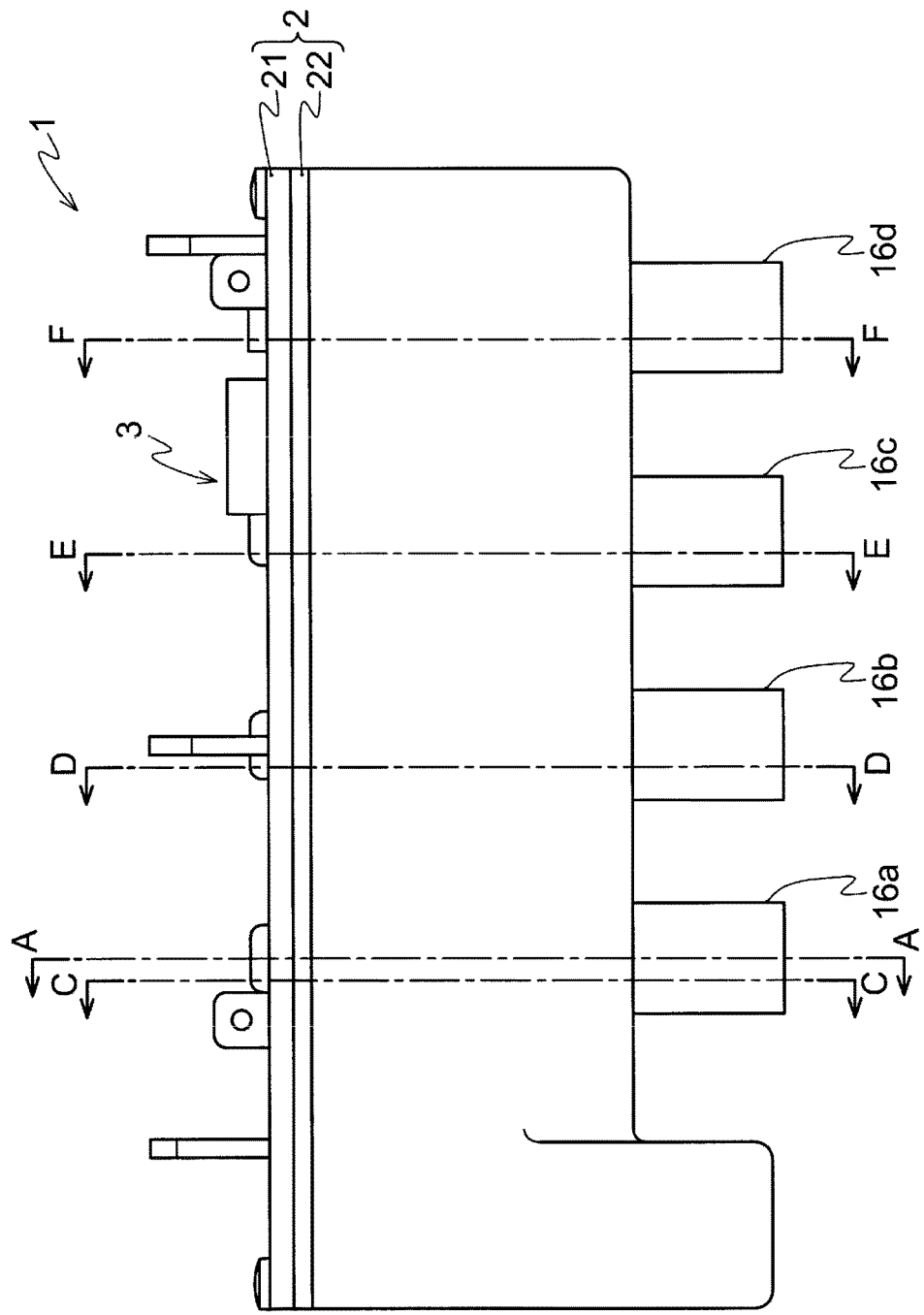

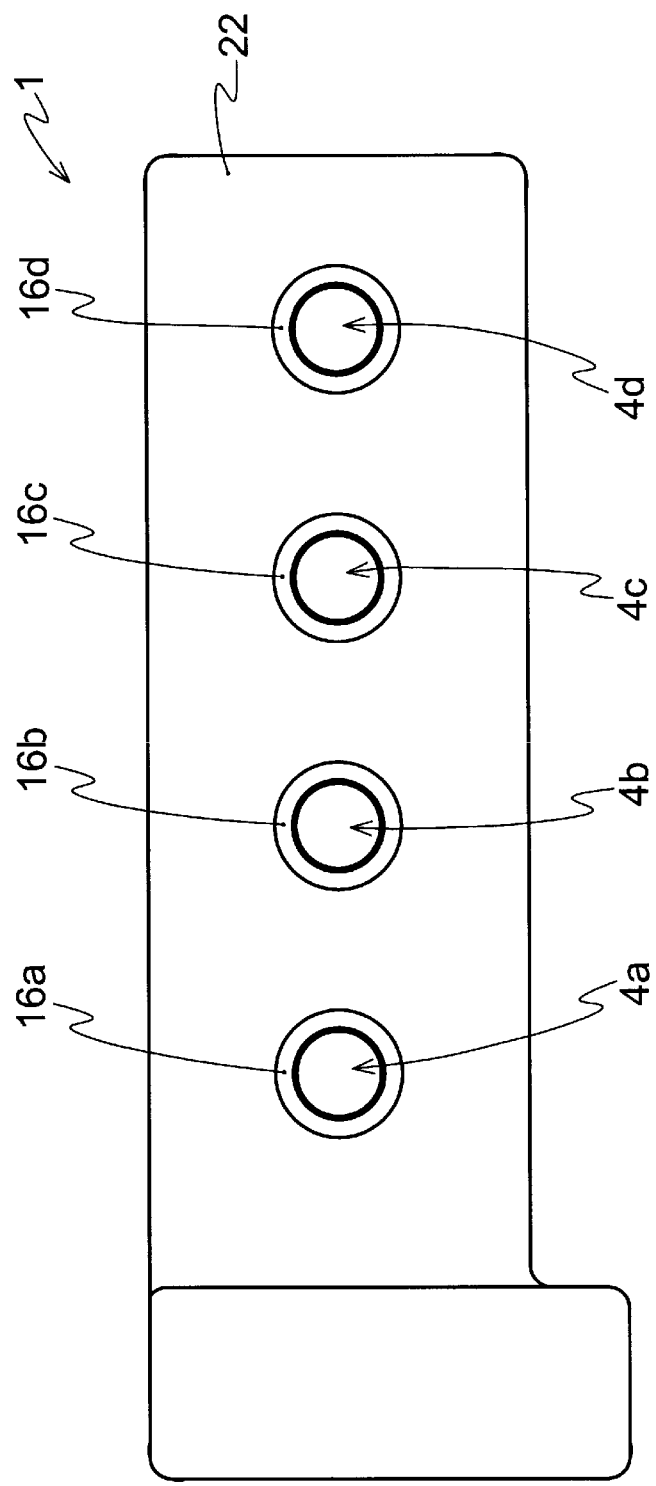

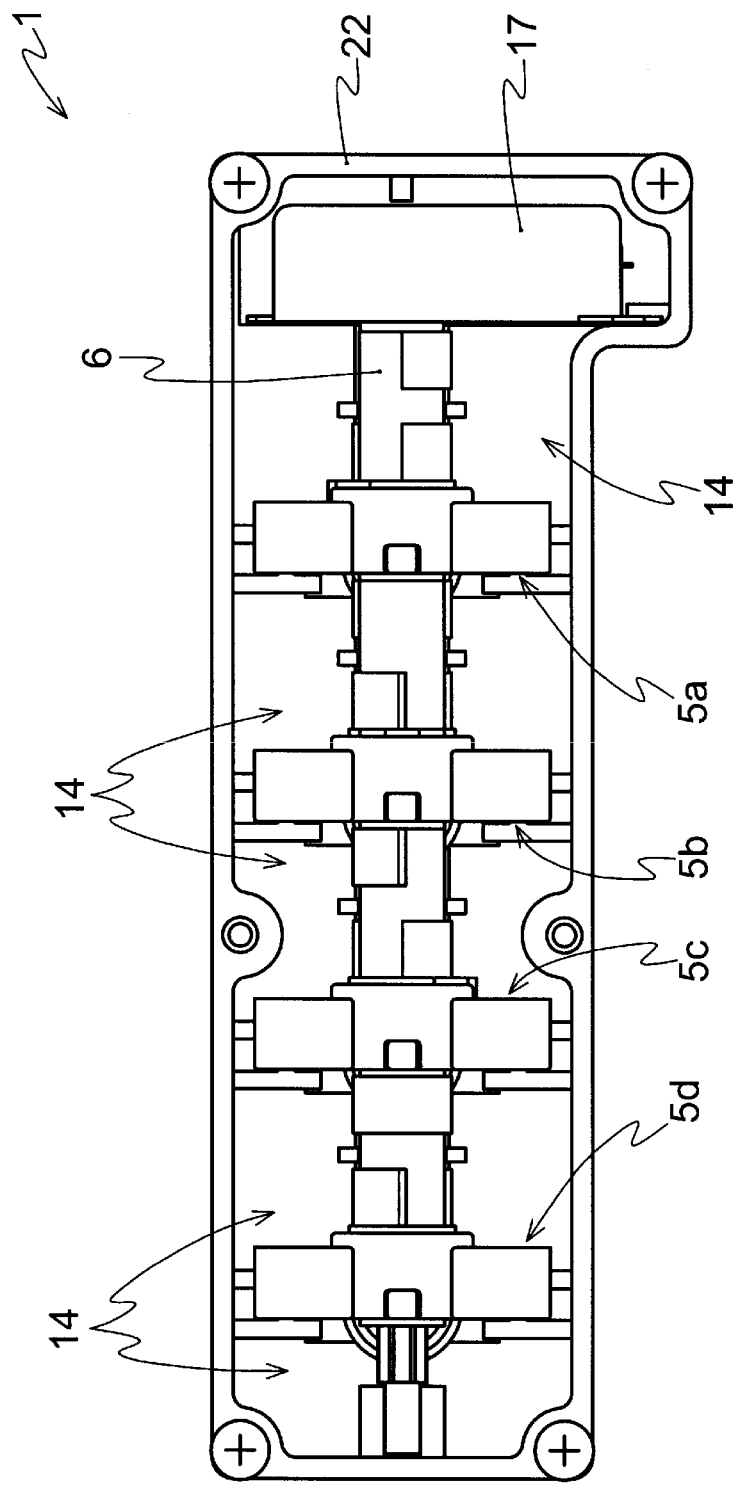

PRIOR ART

PRIOR ART

MULTI-DIRECTIONAL SELECTOR VALVE

CROSS-REFERENCE TO RELATED APPLICATIONS

This application claims priority to and the benefit of Japanese Patent Application No. 2014-150954, filed on Jul. 24, 2014, and Japanese Patent Application No. 2013-167792, filed on Aug. 12, 2013, the disclosures of which are incorporated herein by reference in their entireties.

FIELD

The presently disclosed embodiment relates to a multi-directional selector valve for switching a destination and discharging a fluid fed from a pump or the like, and in particular to a multi-directional selector valve which is capable of controlling switching of a destination by rotation of a drive body and is used for supplying air to an indoor air mat and a bedsore preventing mat or feeding oxygen into a water tank for aquarium fish and a septic tank.

BACKGROUND

So far, as a valve for distributing air supplied from an air pump or the like into a plurality of pipes, there is, for example, a selector valve configured so as to open or close two discharge ports 104a and 104b by subjecting a movable valve 121 connected to a spring 108 and an electromagnetic device 120 such as a solenoid via a piston rod 126 to reciprocating motion by a biasing action of the spring 108 and a driving force of the electromagnetic device 120 as shown in FIG. 13. Namely in FIG. 13, while an electric current is not fed to the electromagnetic device 120, the movable valve 121 is drawn toward the right side in FIG. 13 due to the biasing action of the spring 108 to close the discharge port 104a, and as a result, the air supplied from an air pump or the like and flowing into an air chamber 123 at the suction side passes through the discharge port 104b and is discharged into a discharge pipe 124b. On the other hand, when an electric current is fed to the electromagnetic device 120, the movable valve 121 is moved toward the left side in FIG. 13 due to the driving force of the electromagnetic device 120 resisting the biasing action of the spring 108 to close the discharge port 104b, and the air supplied from an air pump or the like passes through the discharge port 104a and is discharged into a discharge pipe 124a.

Further, as shown in FIGS. 14A and 14B and FIGS. 15A-15C, there is a selector valve in which a piston rod 226 on which a plurality of movable valves 221a-221e are mounted apart from each other is inserted into a cylinder 225 provided with a suction portion 223 and a plurality of discharge portions 222a-222c, and by subjecting this piston rod 226 to reciprocating motion in the cylinder 225 by means of a drive source 214, the suction portion 223 is communicated with any of the discharge portions 222a-222c via a space partitioned by the movable valves 221a-221e in the cylinder 225. FIGS. 14A and 14B represents a selector valve for distributing air to the two discharge portions 222a and 222b, and FIGS. 15A-15C represents a selector valve for distributing air to the three discharge portions 222a-222c. In FIGS. 15A-15C, the suction portion 223 is connected to the cylinder 225 via a branching port 228a or 228b. In the state shown in FIG. 14A, the air supplied from an air pump or the like and flowing into the suction portion 223 passes through the space at the left side of the movable valve 221a and is discharged into the discharge portion 222a, and on the other hand, as shown in FIG. 14B, when the piston rod 226 is moved until the movable valve 221a is located at the left side of an opening 223a of the suction portion 223, the air passes through the space between the movable valve 221a and the movable valve 221b in the cylinder 225 and is discharged into the discharge portion 222b. In the state shown in FIG. 15A, the air supplied from an air pump or the like and flowing into the suction portion 223 passes through the branching port 228a and the space between the movable valve 221b and the movable valve 221c in the cylinder 225 and is discharged into the discharge portion 222a, and in FIG. 15A, when the piston rod 226 is moved toward the right direction, as shown in FIGS. 15B and 15C, the discharge portion communicating with the suction portion 223 is changed from the discharge portion 222a to the discharge portion 222b, further to the discharge portion 222c in order according to the positions of the movable valves 221a-221e, and the air supplied from an air pump or the like is discharged into any of the discharge portions 222a-222c communicating with the suction portion 223.

The conventional selector valve shown in FIG. 13 is configured such that air from the suction side is discharged to any one of the two discharge ports 104a and 104b, and the other discharge port is closed with the movable valve 121 driven by the electromagnetic device 120. Therefore, in the case where there are more than two branches, for each of additional branches, the electromagnetic device 120 and the movable valve 121 are to be added to either of the discharge pipe 124a side of the discharge port 104a or the discharge pipe 124b side of the discharge port 104b or to the both thereof, and thus, there is a problem that the number of electromagnetic devices 120 increases, cost increases largely and a size of the selector valve increases. Further, when using a plurality of electromagnetic devices 120 as mentioned above, it is necessary to control feeding of electric current for driving each of the electromagnetic devices 120, and yet to control it in connection with switching of feeding or stopping of electric current for driving to other electromagnetic devices 120, which causes a problem of complicated control of opening/closing of the discharge port. Furthermore, there is a problem that the increased number of electromagnetic devices 120 increases a failure rate of the selector valve.

Further, since the movable valve 121 is pressed onto the discharge ports 104a and 104b repeatedly, there is a possibility that the movable valve 121 is broken or falls into a condition that it cannot exhibit normal function due to its abrasion or deformation. In that case, the movable valve 121 needs to be replaced. However, in the case of the selector valve shown in FIG. 13, there is a problem that since the movable valve 121 is fixed to a piston rod 126, it cannot be removed easily, and so it is replaced together with the piston rod 126 or the electromagnetic device 120, resulting in increased cost.

Further, the selector valve shown in FIGS. 14A and 14B and FIGS. 15A-15C is configured such that a flow path is formed by combination of the cylinder 225 with the two-way branched flow paths between the suction portion 223 and the plural discharge portions 222a-222c, and the flow path to the discharge portions other than the discharge portion from which air is discharged is blocked with the movable valves 221a-221e. Therefore, there is a problem that for two each of additional branches, branched flow paths such as branching ports 228a and 228b shown in FIG. 13 are needed in the flow path at the suction portion 223 side, resulting in increase in cost and size of the selector valve.

Further, also in the selector valve shown in FIGS. 14A and 14B and FIGS. 15A-15C, since the movable valves 221a-221e slide while being in contact with the inner wall of the cylinder 225, there is a possibility that they need to be replaced due to breakage or the like. However, since the movable valves 121 are fixed to the piston rod 226, they cannot be removed easily, and so they need to be replaced together with the piston rod 226 or the drive source 214, resulting in increased cost.

The presently disclosed embodiment was made in light of the above-mentioned situation, and the object of the presently disclosed embodiment is to provide a multi-directional selector valve which makes it possible to control opening and closing of plural discharge ports in an easy manner and yet minimize increase in cost and size in the case where the number of branches is increased.

Another object of the presently disclosed embodiment is to provide a multi-directional selector valve which makes it possible to easily replace only the valve body, thereby reducing cost for maintaining function of the valve in the case where the valve body falls into a state of being unusable due to breakage, abrasion or deformation.

SUMMARY

A multi-directional selector valve of the presently disclosed embodiment comprises a valve case provided with a suction port into which a fluid flows and at least two discharge ports from which the fluid flows out, at least two valve bodies for opening and closing the at least two discharge ports, a drive body formed into a rod-like shape and provided for driving the valve bodies, and a drive source for rotating the drive body, and is configured such that any of convex portions provided on the side of the drive body are pressed onto any of the at least two valve bodies by the rotation of the drive body, thereby opening or closing the at least two discharge ports in order.

Here, the convex portion means a portion protruding outward on the side of the drive body formed in the rod-like shape, and includes both of a protruded portion integrally formed with the drive body and a protruded portion formed separately from the drive body and mounted on the drive body.

The at least two valve bodies are provided along the axial direction of the drive body, and the valve body provided with a blocking portion at one end thereof for closing the discharge ports, an elastic member portion at the other end thereof for generating an elastic force for moving the blocking portion and a main body portion connecting the blocking portion with the elastic member portion and having a through-hole penetrating the valve body in the direction intersecting the direction of movement of the blocking portion moved by the elastic force. The drive body is inserted into the through-holes of the at least two valve bodies, and any of the convex portions are pressed onto each of the at least two valve bodies in order by the rotation of the drive body, thereby moving the blocking portion toward the direction intersecting the drive body. This configuration is preferable since the at least two discharge ports are easily opened or closed in order.

The elastic member portion is configured so as to generate an elastic force for moving the blocking portion to close the discharge port, and the blocking portion may be configured such that when the convex portion is pressed onto the valve body, the blocking portion separates from the discharge port to open the discharge port.

The valve is configured such that a wall surface at least having a portion facing toward the same direction as the moving direction of the blocking portion moved by the elastic force or toward a direction at a sharp angle to the moving direction is formed on a part of the valve body, and a plate cam having a top portion formed being protruded on its outer periphery is provided on the drive body and the top portion is provided as the convex portion of the drive body, and the top portion of the plate cam is pressed onto the wall surface at a predetermined rotation angle of the drive body. Such configuration is preferable since the convex portion is easily pressed onto the valve body by the rotation of the drive body.

The elastic member portion may be configured such that it includes a pair of plate springs having a cross-section in a doglegged form, and the ends of the pair of plate springs opposite the blocking portion is supported on the inner wall of the valve case.

The elastic member portion may be configured such that it includes a coil spring, and one end of the coil spring is supported on the inner wall of the valve case and the other end of the coil spring is supported on the other end side of the valve body.

The at least two discharge ports are arranged along the axial direction of the drive body on one surface of the valve case, and the convex portions may be arranged facing toward different directions in the circumferential direction of the drive body.

It is preferable that the convex portions are formed integrally with the drive body and the drive body is configured so as to be formed by connecting two or more component parts being connectable and separable to and from each other since it is easy to assemble the multi-directional selector valve and add or detach the valve body.

According to the presently disclosed embodiment, the valve is configured such that the suction port and the plurality of discharge ports are provided on the valve case, and the plurality of valve bodies is pressed by the convex portions provided on the side of the drive body by the rotation of the drive body, thereby opening and closing the plurality of the discharge ports in order. Therefore, the opening and closing of the plurality of the discharge ports can be controlled only by easy operation such as rotation of the drive body. Further even the multi-directional selector valve distributing air to many branches can be realized only by providing additional valve bodies and convex portions without increasing drive sources and providing branched flow paths at the suction side according to the number of discharge ports added. Therefore, increase in cost and size can be minimized and a multi-directional selector valve assuring failure minimization and having high reliability can be achieved.

For example, when the valve structure is configured so that the valve body is provided with the blocking portion for closing the discharge port at one end thereof and the elastic member portion generating an elastic force for moving the blocking portion at the other end, the plurality of the discharge ports are arranged along the axial direction of the drive body and the drive body is inserted into the respective through-holes of the plurality of the valve bodies, the opening and closing of the plurality of the discharge ports can be achieved by pressing the convex portions onto the plurality of the discharge ports in order by the rotation of the drive body, thereby moving the respective blocking portions of the plurality of the valve bodies in the direction intersecting the drive body. In this configuration, the valve body is not moved with the same motion as rotation motion of the drive body, but the convex portion is pressed onto the valve body by the rotation of the drive body, thereby moving the blocking portion of the valve body in the direction intersecting the drive body. Therefore, the valve body may not be fixed to the drive body. Thus, when the blocking portion and the elastic member portion are broken or worn out, only the broken valve body can be taken out from the drive body and replaced easily, and cost for maintaining the function of the multi-directional selector valve can be reduced.

BRIEF DESCRIPTION OF THE DRAWINGS

FIG. 1A is an outline plan view of a multi-directional selector valve according to one aspect of the presently disclosed embodiment.

FIG. 1B is an outline front view of a multi-directional selector valve according to one aspect of the presently disclosed embodiment.

FIG. 2B is a view of the inside of a second housing of the multi-directional selector valve of FIGS. 1A-1C from which a first housing has been removed.

DETAILED DESCRIPTION

Figure 1C:
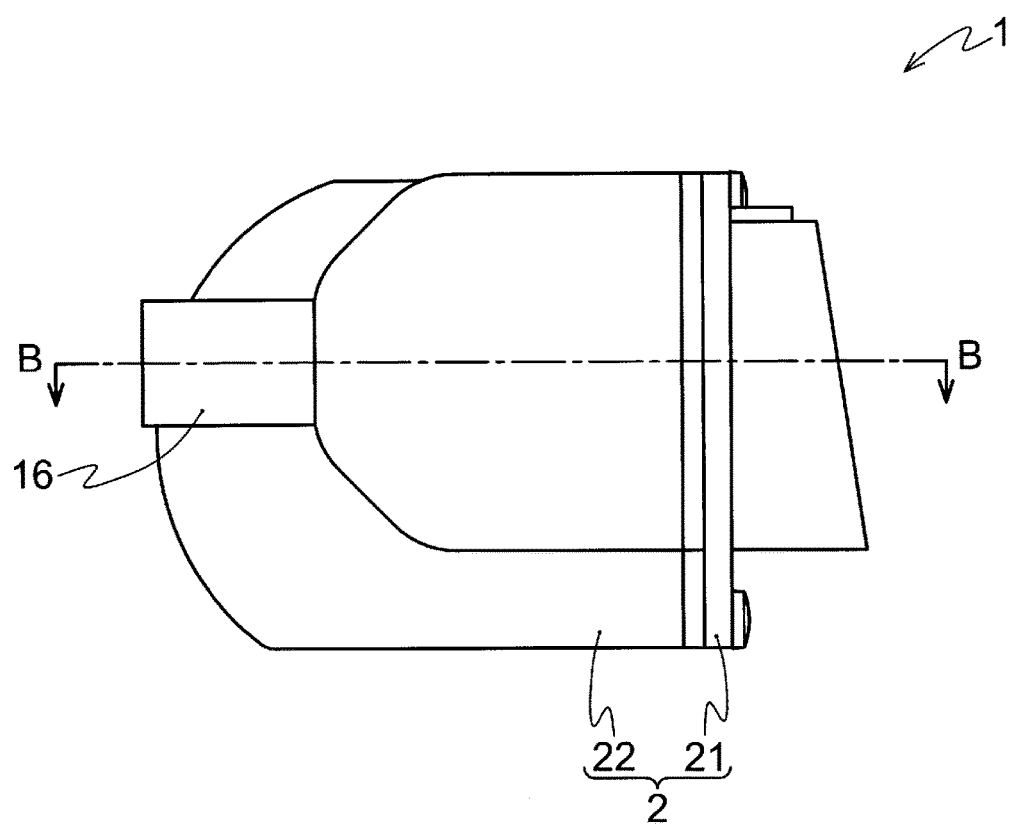
FIG. 1C is an outline right side view of a multi-directional selector valve according to one aspect of the presently disclosed embodiment.

Next, one aspect of the multi-directional selector valve of the presently disclosed embodiment is explained by referring to FIGS. 1A-1C, 2A, 2B, 3A, 3B, 4A-4D and 5. FIGS. 4A-4D represent a front view, a left side view, a rear view and a plan view, respectively of the valve body 5 according to one aspect of the presently disclosed embodiment. The multi-directional selector valve 1 of this aspect of the presently disclosed embodiment is configured so as to comprise a valve case 2 provided with a suction port 3 into which a fluid flows and discharge ports 4a-4d from which the fluid flows out, valve bodies 5a-5d provided for opening or closing the discharge ports, a cam shaft 6 which is a drive body formed into a rod-like shape and provided for driving the valve bodies 5a-5d and a drive source 17 for rotating the cam shaft 6. In this aspect of the presently disclosed embodiment, plate cams 10a-10d are provided on the cam shaft 6, and the cam shaft 6 has, on its side of the outer periphery, convex portions consist of top portions 11a-11d of the plate cams 10a-10d. The multi-directional selector valve 1 of this aspect of the presently disclosed embodiment is configured such that the top portions 11a-11d of the respective plate cams 10a-10d are pressed onto the valve bodies 5a-5d by the rotation of the cam shaft 6 to open or close the discharge ports 4a-4d in order. Therefore, the opening and closing of the plurality of discharge ports 4a-4d can be controlled only by simple operation, i.e. the rotation of the cam shaft 6. Further, since the plural discharge ports 4a-4d can be opened or closed in order by the rotation of one cam shaft 6, it is possible to configure the multi-directional selector valve being capable of discharging air to more branches only by increasing the number of valve bodies 5 and plate cams 10. The opening and closing operations of the discharge ports 4a-4d of this aspect of the presently disclosed embodiment can be achieved specifically by the structure as mentioned below.

Figure 2A:
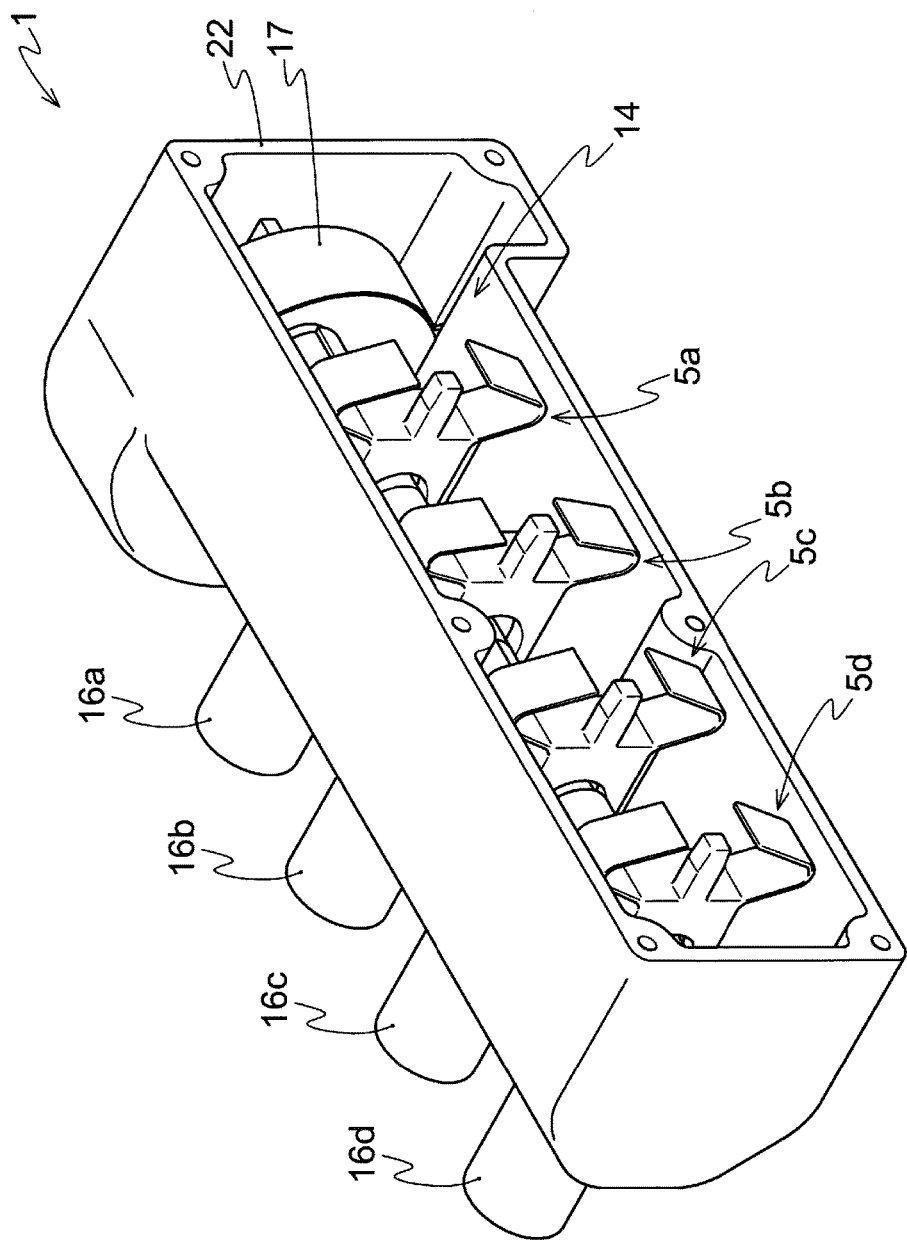
FIG. 2A is a perspective view of the multi-directional selector valve of FIGS. 1A-1C from which a first housing has been removed.
Figure 3A:
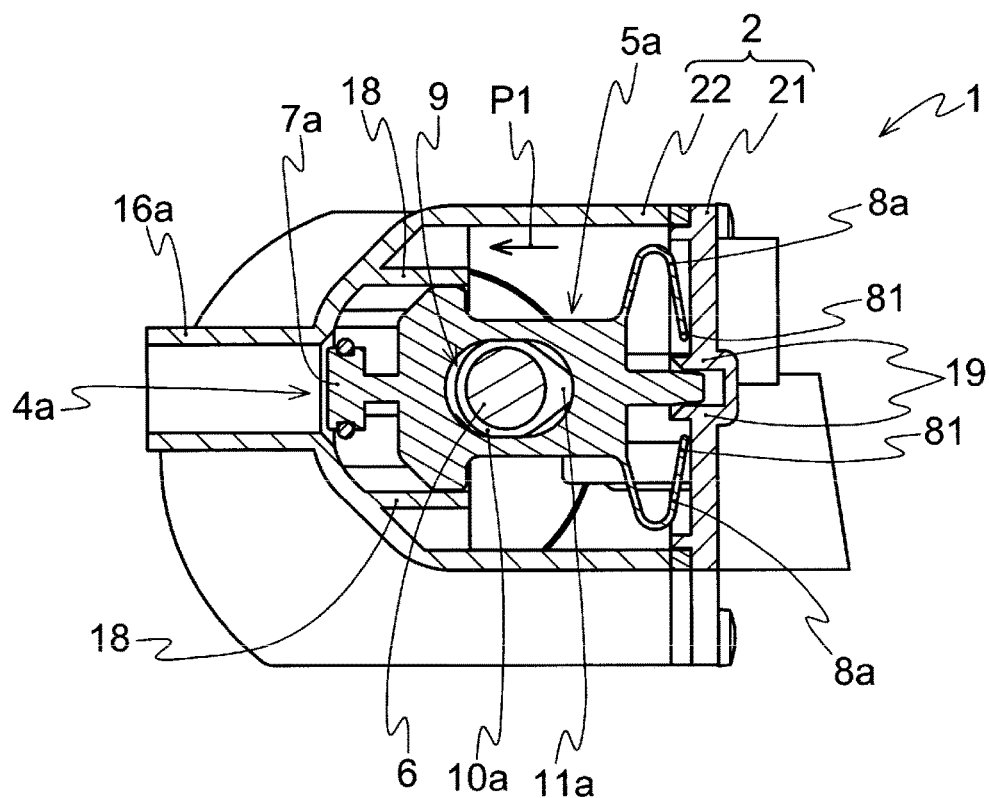
FIG. 3A is a cross-sectional view of A-A line of FIG. 1A.
Figure 3B:
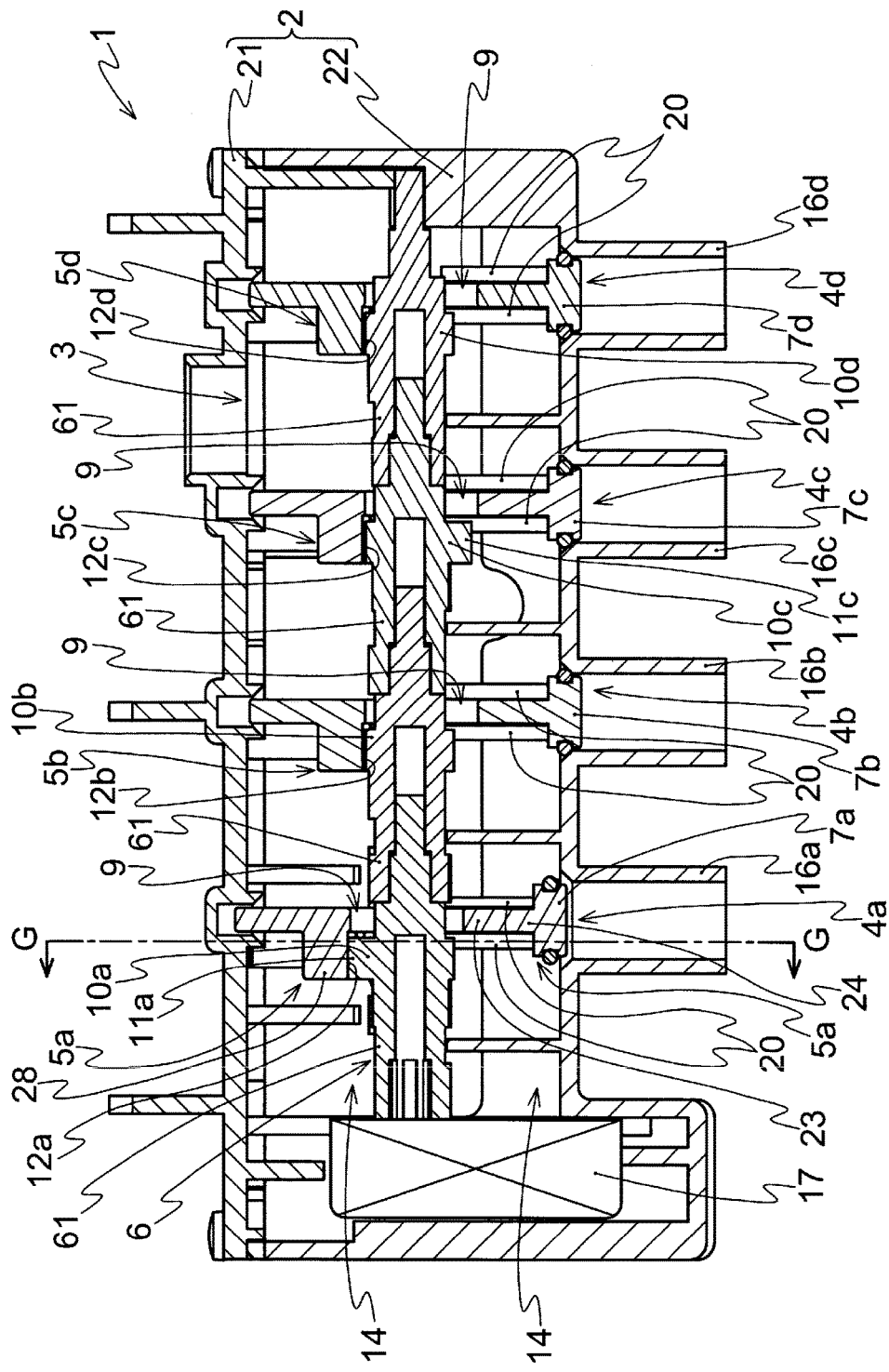
FIG. 3B is a cross-sectional view of B-B line of FIG. 1C.
Figure 4A:
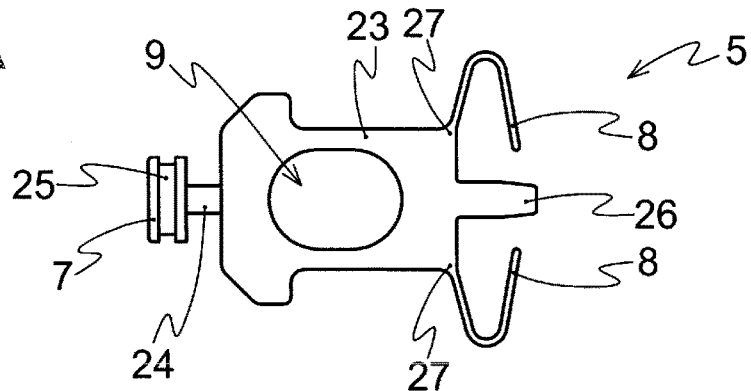
FIG. 4A is a view for explaining a valve body according to one embodiment of the present invention.
Figure 4B:
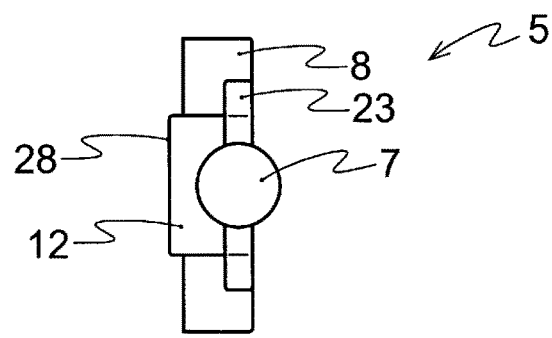
FIG. 4B is a view for explaining a valve body according to one aspect of the presently disclosed embodiment.
Figure 4C:
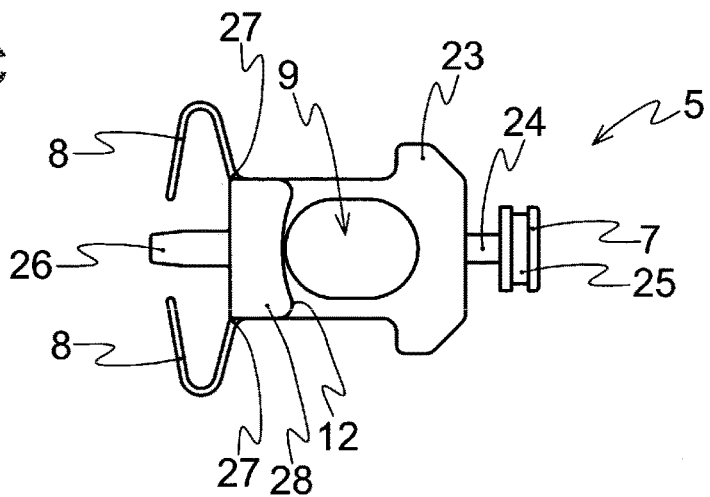
FIG. 4C is a view for explaining a valve body according to one aspect of the presently disclosed embodiment.
Figure 4D:
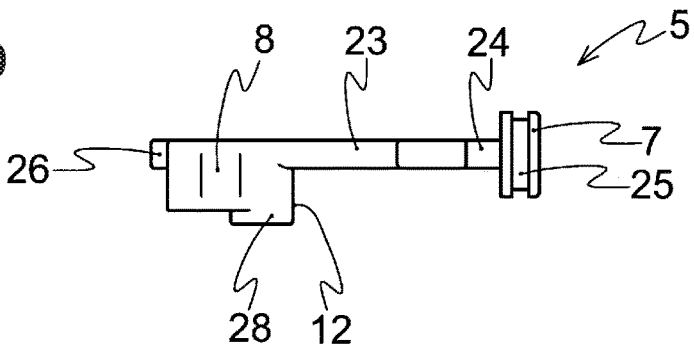
FIG. 4D is a view for explaining a valve body according to one aspect of the presently disclosed embodiment.
Figure 5:
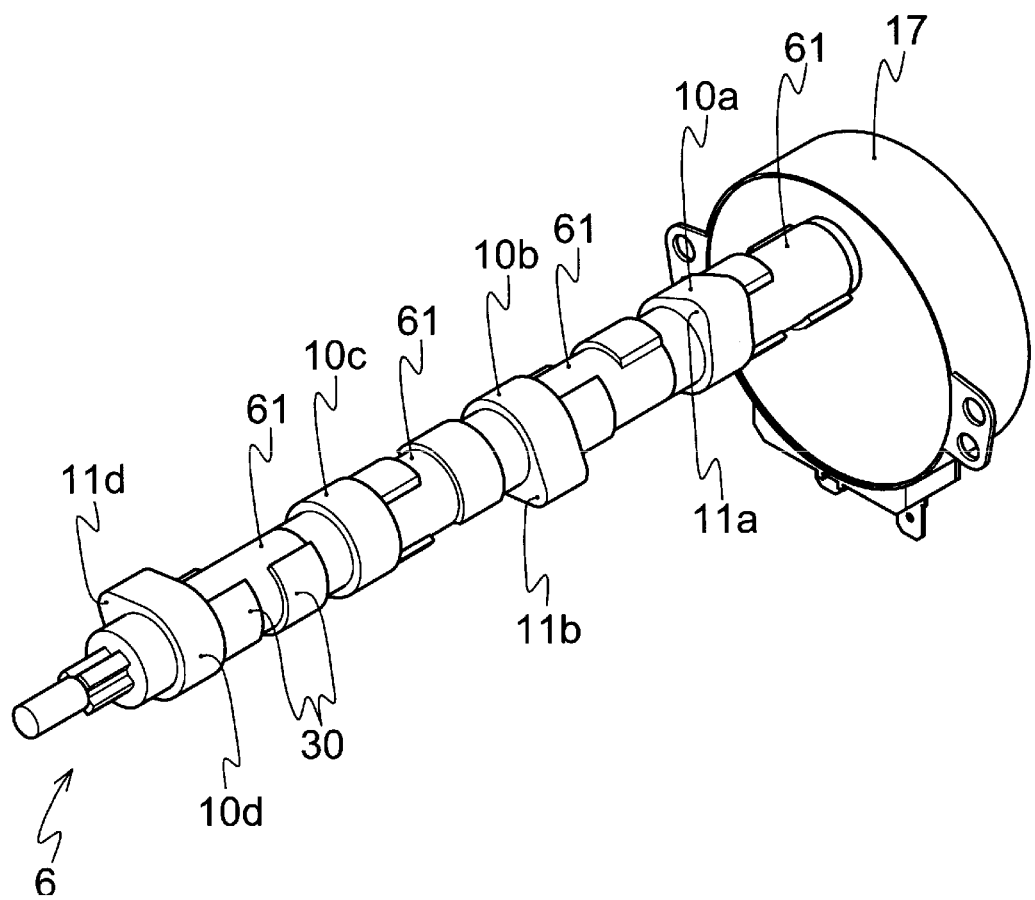
FIG. 5 is a view for explaining a drive body according to one aspect of the presently disclosed embodiment.

In this aspect of the presently disclosed embodiment, as shown in FIGS. 1B and 3B, the four discharge ports 4a-4d are provided along the axial direction of the cam shaft 6. Also, as shown in FIG. 4A, in this aspect of the presently disclosed embodiment, the valve body 5 has the blocking portion 7 closing any of the discharge ports 4a-4d at one end on the left side in FIG. 4A, the pair of plate springs 8 being an elastic member portion generating an elastic force for moving the blocking portion 7 at the other end on the right side in FIG. 4A, and a main body portion 23 connecting the blocking portion 7 with the plate spring 8 and having the through-hole 9 penetrating the valve body 5 in a direction intersecting the moving direction (left direction or right direction on FIG. 4A) of the blocking portion 7 moved by the elastic force of the plate spring 8. The cam shaft 6 is inserted into the respective through-holes 9 of the four valve bodies 5a to 5d as shown in FIGS. 2A and 2B. In this aspect of the presently disclosed embodiment, as shown in FIG. 5, the respective plate cams 10a-10d are provided on the cam shaft 6 so that the top portions 11a-11d face toward different directions (directions being different by an angle of every 90° in this aspect of the presently disclosed embodiment) in the circumferential direction of the cam shaft 6. This makes it possible that the respective top portions 11a-11d of the plate cams 10a-10d are pressed onto the valve bodies 5a-5d, respectively at different time by the rotation of the cam shaft 6 to move the blocking portions 7a-7d in the direction intersecting the axial direction of the cam shaft 6 and open or close the discharge ports 4a-4d in order. In such configuration as mentioned above, the valve bodies 5a-5d are not moved with the same motion as rotation motion of the cam shaft 6, but the blocking portions 7a-7d of the valve bodies 5a-5d are moved in the direction intersecting the cam shaft 6 by pressing, onto the valve bodies 5a-5d, the respective top portions 11a-11d of the plate cams 10a-10d disposed on the cam shaft 6. Therefore, the valve bodies 5a-5d may not be fixed to the cam shaft 6, and so, if any of the valve bodies 5a-5d is broken or is worn out, it can be easily removed from the cam shaft 6 and replaced. In addition, in this aspect of the presently disclosed embodiment, the four discharge ports 4a-4d are provided, and the corresponding four each of valve bodies 5a-5d and plate cams 10a-10d are provided. However, plural number other than four of discharge ports may be provided.

In this aspect of the presently disclosed embodiment, as shown in FIGS. 1A-1C, the valve case 2 is formed by combining a first housing 21 and a second housing 22. The first housing 21 is provided with a suction port 3 communicating with an air path 14 which is an inner space of the second housing 22 shown in FIGS. 2A and 2B, and in this aspect of the presently disclosed embodiment, in the second housing 22, four discharge pipes 16a-16d are arranged in a row and the discharge pipes 16a-16d are communicated with the air path 14 via the discharge ports 4a-4d. Air from the suction port 3 circulates in the air path 14 and is discharged from any of the discharge ports 4a-4d which is not closed by the blocking portions 7a-7d of the valve bodies 5a-5d. The suction port 3 may be connected to, for example, an air pump via an air supply pipe, and the discharge ports 4a-4d may be connected to, for example, a plurality of different septic tanks via the discharge pipes 16a-16d. The material of the valve case 2 is not limited particularly, and metal, plastic or the like may be used therefor.

In this aspect of the presently disclosed embodiment, as shown in FIGS. 2A, 2B and 3B, the four valve bodies 5a-5d, the cam shaft 6 inserted into the through-holes 9 of these valve bodies 5a-5d and the drive source 17, to which the cam shaft 6 is connected, and driving the rotation of the cam shaft 6 are disposed in the air path 14.

The valve bodies 5a-5d are designed so that the vertical direction thereof is guided by the guiding portions 18 and 19 along the moving direction P1 of the valve bodies 5a-5d as shown in FIG. 3A, and the axial direction of the cam shaft 6 (a thickness direction of a main body portion 23 explained later) is guided by the guiding portions 20 as shown in FIG. 3B. The blocking portions 7a to 7d provided at one end each of the valve bodies 5a-5d are located so as to face the discharge ports 4a-4d, respectively. In this aspect of the presently disclosed embodiment, the plate springs 8a-8d provided at the other end side of the valve bodies 5a-5d are disposed so that when the first housing 21 is combined with the second housing 22, the end portions 81 opposite to the blocking portions 7a-7d are pressed onto the inner walls of the first housing 21 and are in a compressed state. Therefore, the plate springs 8a-8d always generate an elastic force for returning to an equilibrium state and are always biasing the blocking portions 7a-7d toward the discharge ports 4a-4d. FIG. 3A shows that the valve body 5a is pressed toward the right direction in FIG. 3A by means of the top portion 11a of the plate cam 10a, the plate spring 8a is further compressed and the discharge port 4a is in an opened state.

As shown in FIG. 3B, the valve bodies 5a-5d are disposed in a position where at least a part of wall surfaces 12a-12d provided on the valve bodies 5a-5d face the four plate cams 10a-10d provided on the cam shaft 6 in the axial direction of the cam shaft 6 and at a part of a circumferential direction of the cam shaft 6. By disposing the valve bodies 5a-5d in such a position, it is possible that the top portions 11a-11d of the plate cams 10a-10d are pressed onto the wall surfaces 12a-12d by the rotation of the cam shaft 6, and the blocking portions 7a-7d are moved in the direction intersecting the cam shaft 6, thereby enabling the discharge ports 4a-4d to be opened. FIG. 3B shows only the top portion 11a of the plate cam 10a located at the leftmost side is in a state of being pressed onto the wall surface 12a provided on the valve body 5a. Therefore, FIG. 3B shows only the discharge port 4a located opposite to the blocking portion 7a provided on the valve body 5a is in an opened state, and the other discharge ports 4b-4d are in a closed state. In addition, in FIG. 3B, the top portion 11c of the plate cam 10c combined with the valve body 5c is shown in a state of facing the discharge port 4c side, and the top portions of the plate cams 10b and 10d face in a vertical direction with respect to the cross-section shown in FIG. 3B, and therefore are not shown.

As shown in FIGS. 4A-4D, the blocking portion 7 of the valve body 5 of this aspect of the presently disclosed embodiment is formed into a disk-like shape and on the side periphery of the blocking portion 7, a groove 25 for fitting an O-ring thereto is provided. The main body portion 23 of the valve body 5 is formed into a plate-like shape and a through-hole 9 is provided around the center thereof for inserting the cam shaft 6 thereinto. The through-hole 9 is formed into a long hole at least having a length for a stroke of the valve body 5 along the moving direction of the valve body 5 at around the center of the main body portion 23 so that the valve body 5 can move regarding the cam shaft 6 in the direction intersecting the axial direction of the cam shaft 6. The respective one ends of the pair of plate springs 8 of the valve body 5 of this aspect of the presently disclosed embodiment are jointed to the ends 27 of upper and lower two sides of the main body portion 23 at the other end side as shown in FIG. 4A, and the main body portion 23 and the blocking portion 7 are connected by means of a connection portion 24 having a width nearly equal to the thickness of the main body portion 23. On the other end side of the main body portion 23, a guided portion 26 which is guided by the guiding portion 19 of the first housing 21 (See FIG. 3A) and protrudes toward the moving direction of the valve body 5 from the other end side of the main body portion 23 is provided.

The plate springs 8 are formed so as to have a cross-section in the doglegged form as if a rectangular thin plate is bent around the center in its lengthwise direction. The thickness of the plate spring 8 and the shape of the bent portion thereof are not limited particularly, and it is preferable that the bent portion is formed at a curvature radius of 2 to 5 mm at an angle of about 30° to about 50° in a state of a force not being applied to the plate springs 8 since the discharge ports 4*a* to 4*d* can be properly opened or closed by the blocking portion 7 of the valve body 5.

On the main body portion 23, a thick portion 28 for forming a wall surface 12 onto which the top portions 11*a*-11*d* of the plate cams 10*a*-10*d* are pressed is formed between the end portion of the other end side of the main body portion and the periphery of the through-hole 9 at the other end side. The thick portion 28 protrudes toward the axial direction of the cam shaft 6 from the surface of the thin plate-like main body portion 23 and is formed thick. The thick portion 28 is formed so that the wall surface 12 at least has a portion facing toward the same direction as the biased direction of the blocking portion 7 or facing toward a direction at a sharp angle to the biased direction, thereby moving the blocking portion 7 in the direction reverse to the biased direction of the blocking portion 7 by an elastic force generated by the plate spring 8 when the thick portion 28 is pressed by the top portions 11*a*-11*d* of the plate cams 10*a*-10*d*.

In this aspect of the presently disclosed embodiment, the through-hole 9 is formed into the long hole, but is not limited to this shape as far as it has a shape and size being capable of inserting a drive body such as the cam shaft 6. Further, in this aspect of the presently disclosed embodiment, the through-hole 9 is formed so as to penetrate the main body portion 23 in the direction being orthogonal to the flat plane of the thin plate-like main body portion 23, but it is not limited to this, and the through-hole 9 may be formed so as to penetrate the main body portion 23 in the direction intersecting the moving direction of the blocking portion 7 by an elastic force generated by the plate spring 8.

In this aspect of the presently disclosed embodiment, since the blocking portion 7, the plate spring 8, the connection portion 24 and the main body portion 23 are integrally formed, the number of component parts can be decreased and the production can be done easily, which makes it possible to reduce cost. However, it should be noted that the valve body 5 may be formed by forming the blocking portions 7 and the plate springs 8 separately and then combining them. The material of the valve body 5 is not limited particularly as far as a sealing property of the blocking portion 7 and a desired elasticity of the plate springs 8 can be obtained, and metal, a resin such as a plastic and a combination thereof can be used.

Figure 11:
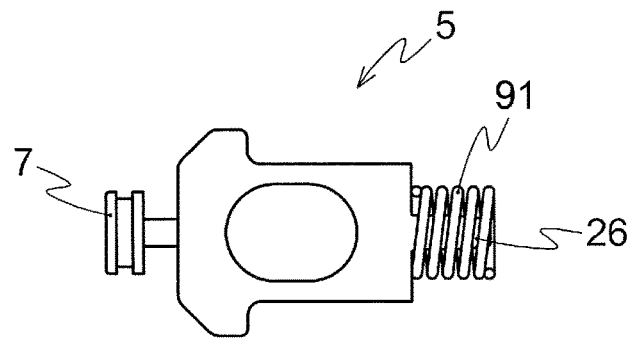
FIG. 11 is a view for explaining other aspects of the presently disclosed embodiment using a coil spring as the elastic member portion of the valve body.
Figure 12:
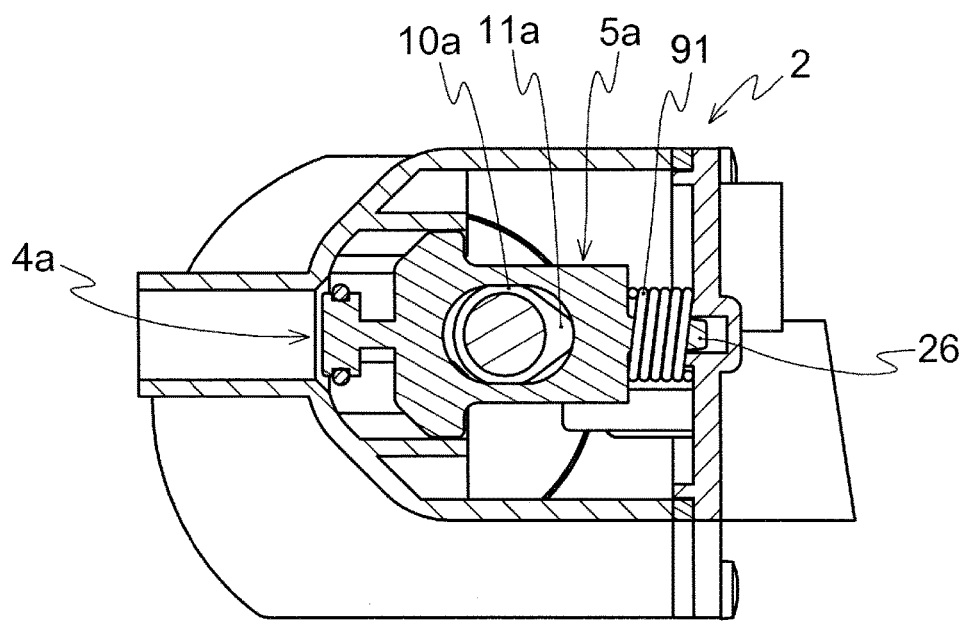
FIG. 12 is a cross-sectional view of A-A line of FIG. 1A when using a coil spring as the elastic member portion.
Figure 13:
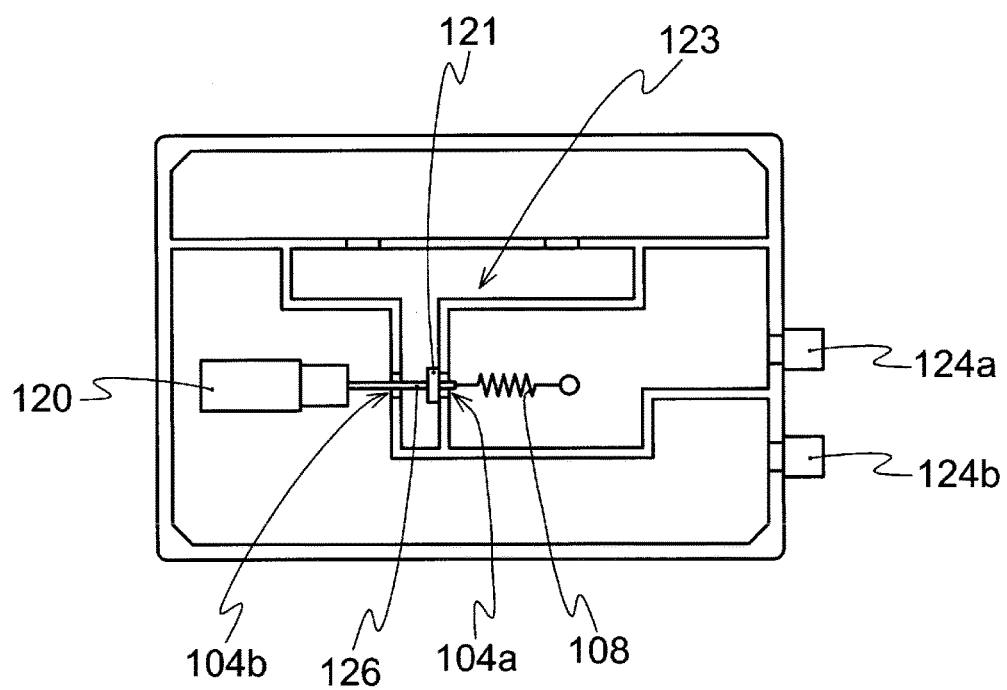
FIG. 13 illustrates an example of a conventional selector valve.
Figure 14A:
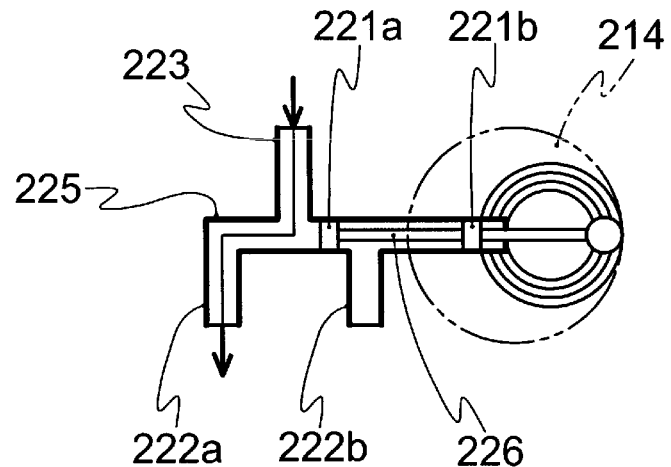
FIG. 14A illustrates another example of a conventional selector valve.
Figure 14B:
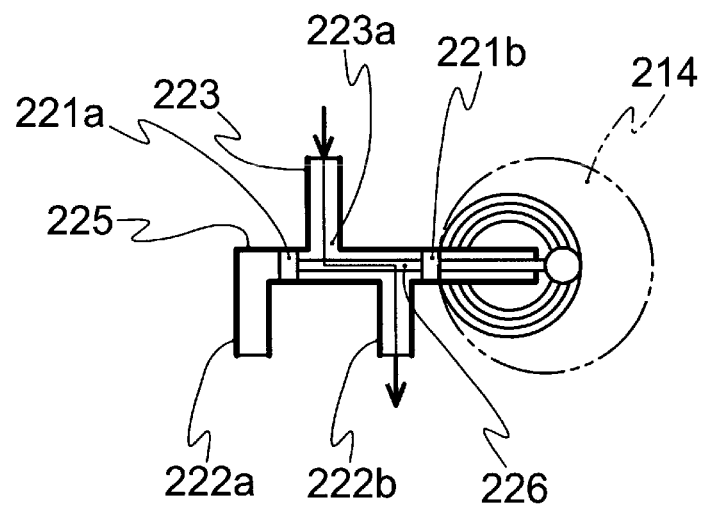
FIG. 14B illustrates another example of a conventional selector valve.
Figure 15A:
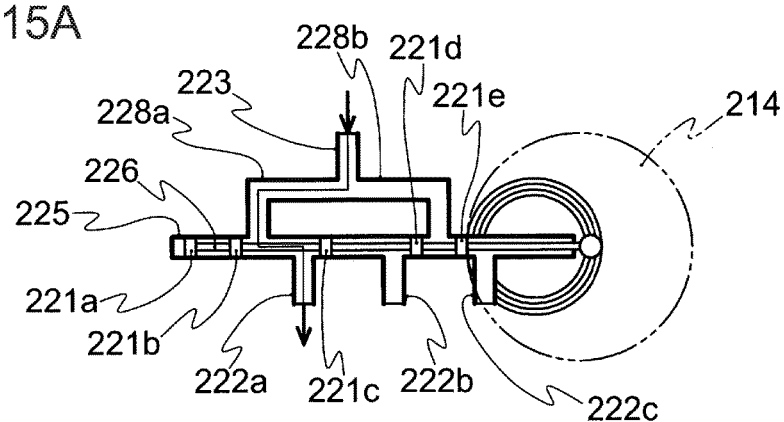
FIG. 15A illustrates other aspects of the presently disclosed embodiment of another example of a conventional selector valve.
Figure 15B:
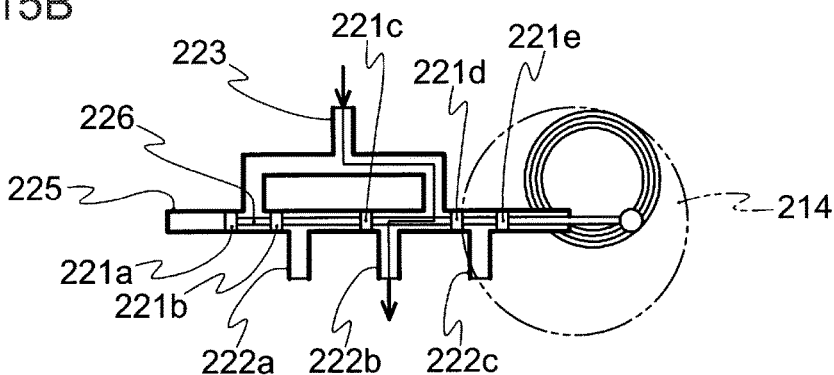
FIG. 15B illustrates other aspects of the presently disclosed embodiment of another example of a conventional selector valve.
Figure 15C:
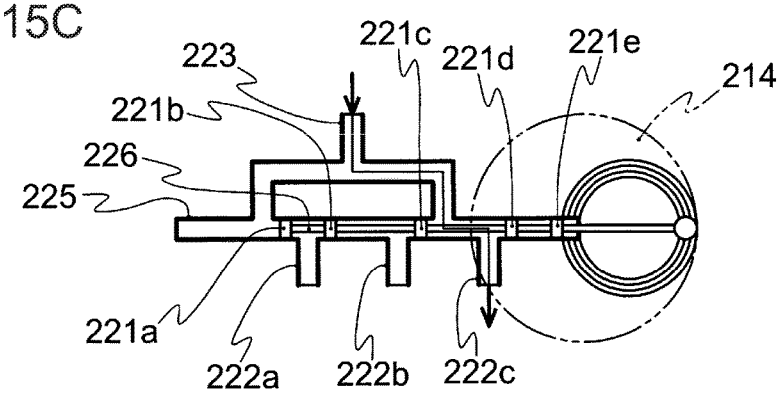
FIG. 15C illustrates other aspects of the presently disclosed embodiment of another example of a conventional selector valve.

This aspect of the presently disclosed embodiment was explained by means of an example using the plate springs 8 as the elastic member portion. However, kind of the elastic member of the elastic member portion is not limited particularly as far as it can bias the blocking portion 7 of the valve body 5 toward the discharge ports 4*a*-4*d*. For example, as shown in FIGS. 11 and 12, coil spring 91 may be used as the elastic member portion. One end of the coil spring 91 is supported on the inner wall of the valve case, and the other end thereof is supported on the other end side of the valve body 5. The coil spring 91 and the valve body 5 may be formed integrally, or may be formed as separate members. In this aspect of the presently disclosed embodiment, the coil spring 91 is, as shown in FIGS. 11 and 12, arranged around the guided portion 26 formed at the other end side of the valve body 5. FIG. 12 shows that the valve body 5*a* is pressed toward the right direction in FIG. 12 by the top portion 11*a* of the plate cam 10*a*, the coil spring is further compressed and the discharge port 4*a* is in an opened state. When the coil spring 91 is used as the elastic member portion, the configuration of the valve body 5 and the valve case 2 may be the same as that in the case of using the plate spring 8. The coil spring 91 shown in the drawings are provided at the other end side of the valve body 5, but its position is not limited particularly as far as it can bias the blocking portion 7 of the valve body 5 toward the discharge ports 4*a*-4*d*. The same thing can be said also with respect to the case of using the plate spring 8.

Figure 6A:
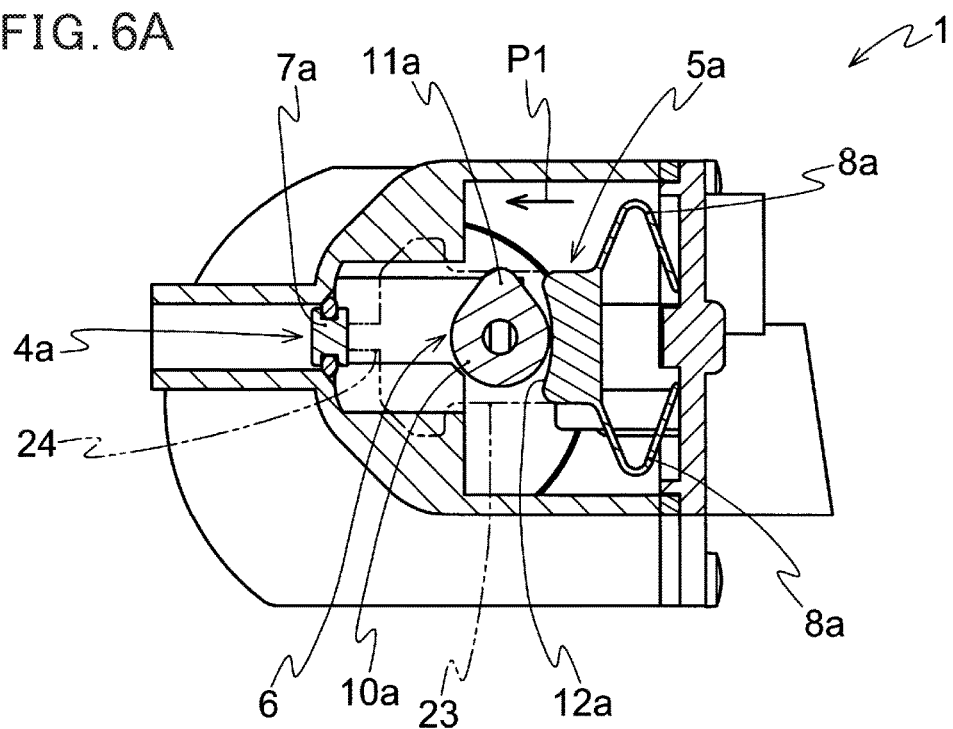
FIG. 6A is a cross-sectional view of C-C line of FIG. 1A for explaining a motion of one example of a valve body according to one aspect of the presently disclosed embodiment.
Figure 6B:
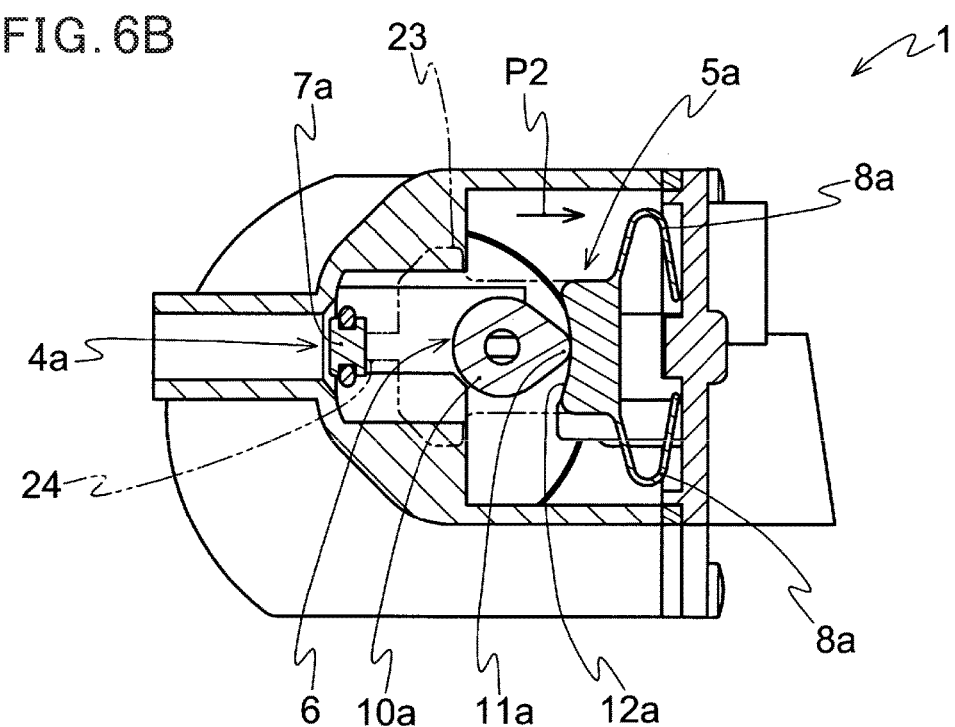
FIG. 6B is a cross-sectional view of C-C line of FIG. 1A for explaining a motion of one example of a valve body according to one aspect of the presently disclosed embodiment.

Next, example of operation of the valve bodies 5*a*-5*d* for opening and closing the discharge ports 4*a*-4*d* in the multi-directional selector valve of this aspect of the presently disclosed embodiment is explained below by referring to FIGS. 6A and 6B. The following explanation is made with respect to the case of using the plate spring 8. Operation of the valve bodies 5*a* to 5*d* using the coil spring 91 is the same as in the case of using the plate spring 8, and therefore, explanation thereof is omitted. FIGS. 6A and 6B show a cross-sectional view of C-C line of FIG. 1A. FIG. 6A shows the discharge port 4*a* being in a closed state, and FIG. 6B shows the discharge port 4*a* being in an opened state. The position of the C-C line of FIG. 1A corresponds to the position of the G-G line in FIG. 3B, and since the G-G line is not on the main body portion 23 other than the thick portion 28 and the connection portion 24, in FIGS. 6A and 6B, the profiles of the main body portion 23 and the connection portion 24 are represented by the two-dot chain lines. As mentioned above, the plate springs 8*a* are designed so as to be normally in the compressed state and an elastic force for returning to an equilibrium state is always generated. Therefore, as shown in FIG. 6A, when the top portion 11*a* of the plate cam 10*a* faces toward the direction such as the upward, downward, or left direction as in FIG. 6A, in which it does not come into contact with the valve body 5*a*, the blocking portion 7*a* is biased toward the side shown by an arrow P1 of FIG. 6A, namely toward the discharge port 4*a* side, thereby closing the discharge port 4*a*. On the other hand, when the cam shaft 6 is driven for rotation by the drive source 17 (See FIG. 3B) to bring the valve to the state shown in FIG. 6B, namely such a state that the top portion 11*a* of the plate cam 10*a* faces toward the right direction in FIG. 6B, the top portion 11*a* of the plate cam 10*a* is pressed onto the wall surface 12*a* provided on the valve body 5*a*, thereby moving the blocking portion 7*a* in the direction intersecting the cam shaft 6, i.e. in the direction shown by an arrow P2 in FIG. 6B and separating the blocking portion 7*a* from the discharge port 4*a* to open the discharge port 4*a*. In this manner, the discharge port 4*a* can be in an opened or closed state by reciprocating motion of the blocking portion 7*a* in the direction intersecting the cam shaft 6 which is performed by an action of the elastic force generated by the plate spring 8a and an action of pressing the top portion 11a of the plate cam 10a onto the valve body 5a by the rotation of the cam shaft 6. In the example of the valve body 5a of this aspect of the presently disclosed embodiment shown in FIGS. 6A and 6B, the discharge port 4a is opened when the valve body 5a is pressed by the top portion 11a of the plate cam 10a, and therefore, the multi-directional selector valve in which the plurality of discharge ports 4a to 4d are opened in order can be provided.

Figure 7A:
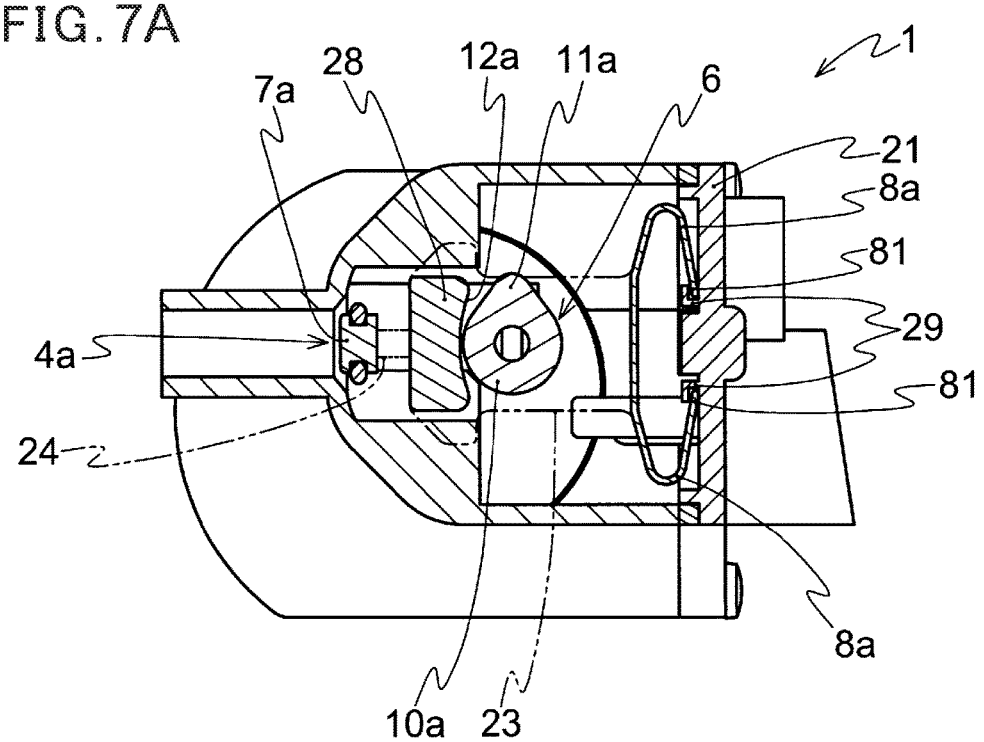
FIG. 7A is a cross-sectional view of C-C line of FIG. 1A for explaining a motion of an alternative valve body according to one aspect of the presently disclosed embodiment having another configuration.
Figure 7B:
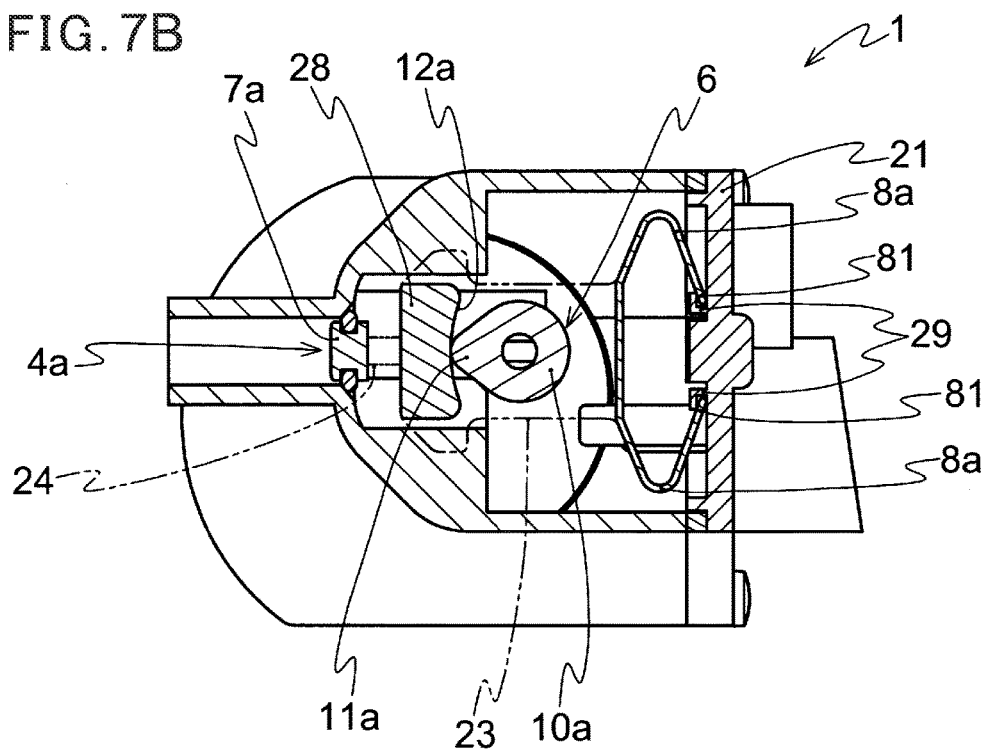
FIG. 7B is a cross-sectional view of C-C line of FIG. 1A for explaining a motion of an alternative valve body according to one aspect of the presently disclosed embodiment having another configuration.

As mentioned above, this aspect of the presently disclosed embodiment is configured such that the blocking portions 7a-7d are biased with the elastic force of the plate springs 8a-8d, thereby closing the discharge ports 4a-4d, and the blocking portions 7a-7d are moved toward the direction reverse to the direction of the elastic force of the plate springs 8a-8d by means of the driving force of the drive source 17, thereby opening the discharge ports 4a-4d. However, the presently disclosed embodiment is not limited to such a configuration. Alternative example of configuration of the valve bodies 5a-5d of this aspect of the presently disclosed embodiment is explained below by referring to FIGS. 7A and 7B. FIGS. 7A and 7B show the cross-section of the C-C line of FIG. 1A. FIG. 7A shows the discharge port 4a being in an opened state, and FIG. 7B shows the discharge port 4a being in a closed state. Also in FIGS. 7A and 7B, the profiles of the main body portion 23 and the connection portion 24 are represented by the two-dot chain lines in the same manner as in FIGS. 6A and 6B. In this alternative example, as shown in FIGS. 7A and 7B, the thick portion 28 forming the wall surface 12a is provided in a region of the valve body 5a located near the blocking portion 7a side rather than the cam shaft 6 inserted into the valve body 5a. Further, end portions 81 of the pair of plate springs 8a disposed at the opposite side of the blocking portion 7a are inserted between the inner wall of the first housing 21 and a hook portion 29 having an L-shape in its cross section and being located on the inner wall of the first housing 21, thereby restricting the moving of the whole plate spring 8a toward the blocking portion 7a side. In this alternative example, the shape of the plate spring 8a and the dimensions of other parts of the valve body 5a are designed so that in a state that the top portion 11a of the plate cam 10a is not pressed onto the wall surface 12a provided on the valve body 5a as shown in FIG. 7A, the plate spring 8a is in an equilibrium state so as not to be compressed or expanded and the discharge port 4a is in an opened state. On the other hand, when the top portion 11a of the plate cam 10a faces the blocking portion 7a side and is pressed onto the wall surface 12a provided on the valve body 5a as shown in FIG. 7B, the plate spring 8a is expanded and the blocking portion 7a is moved toward the discharge port 4a, thus closing the discharge port 4a. When the plate cam 10a is shifted by the rotation of the cam shaft 6 from the state as shown in FIG. 7B to the state that the top portion 11a of the plate cam 10a is not pressed onto the wall surface 12a provided on the valve body 5a, the blocking portion 7a is separated from the discharge port 4a by an elastic force of the plate spring 8a acting in a compressing direction, the discharge port 4a is returned to the opened state and the plate spring 8a also returns to the equilibrium state. The valve body 5a-5d may be configured as mentioned above in the case of the multi-directional selector valve in which the plurality of discharge ports 4a-4d are closed in order.

As shown in FIG. 5, the cam shaft 6 is formed into a rod-like shape, and in this embodiment, the four plate cams 10a-10d are provided apart from each other at the same pitch as that of the discharge ports 4a-4d (See FIG. 3B). The plate cams 10a-10d are formed into a plate-like shape having the top portions 11a-11d, respectively which are protruding on a part of the outer periphery of the plate cams, and thus the convex portions are formed on the side of the cam shaft 6 by the top portions 11a-11d of the plate cams 10a-10d.

One end of the cam shaft 6 is connected to the drive source 17, and the cam shaft 6 is driven and rotated by the drive source 17. The drive source 17 is not limited particularly as long as the cam shaft 6 can be rotated, and in order to secure a predetermined opening time of the discharge ports 4a-4d, a synchronous motor rotating at a low speed and a pulse motor rotating by a predetermined angle for each one pulse of electric power to be supplied in the form of pulse are preferred.

In this aspect of the presently disclosed embodiment, as shown in FIG. 3B and FIG. 5, the cam shaft 6 is composed of a plurality of shaft parts 61 and is formed by connecting the separate shaft parts 61 formed integrally with the respective plate cams 10a-10d in its axial direction. By such connectable configuration, when the number of branches is increased, the plate cams can be increased only by further connecting additional shaft parts 61 according to the increased number of branches without producing a new cam shaft 6. The method of fixing the connection portion of the shaft part 61 is not limited particularly, and the shaft part 61 may be fixed by caulking or screwing, or the shaft parts 61 may be inserted simply in order in the shaft direction without fixing them and as shown in FIG. 3B, the end shaft part 61 may be provided close to the inner wall of the valve case 2, thereby preventing each shaft part 61 from falling during the use thereof. Use of such a method enabling the shaft parts 61 to be separated is preferable since when the number of branches is decreased, excess shaft parts 61 can be removed and the length of the cam shaft 6 can be shortened without producing a new cam shaft 6, and further since when any of the valve bodies 5a-5d are broken, even in the case where the through-holes 9 of the valve bodies 5a-5d are formed in a shape or size being unable to pass the plate cams 10a-10d thereinto, the broken valve bodies 5a-5d can be replaced by separating the shaft parts 61. However, the entire cam shaft 6 may be formed integrally, and also, the respective plate cams 10a-10d may be formed separately from the cam shaft 6 and the shaft parts 61 and then assembled with the cam shaft 6 or the shaft parts 61.

In this aspect of the presently disclosed embodiment, as shown in FIG. 5, the plate cams 10a-10d are arranged so that the respective top portions 11a-11d face different directions at an angle of every 90° in the circumferential direction of the cam shaft 6. By this configuration, by rotating the cam shaft 6, the respective top portions 11a to 11d of the plate cams 10a to 10d are pressed, at different time mutually, onto the wall surfaces 12a to 12d, respectively of the valve bodies 5a to 5d where the wall surfaces 12a to 12d are arranged in the same position in the circumferential direction of the cam shaft 6. Therefore, only by the rotation of the cam shaft 6, the blocking portions 7a-7d of the valve bodies 5a-5d are moved in order and the discharge ports 4a-4d can be in an opened state in order. The switching of the discharge ports 4a-4d to an opened or closed state is explained referring to FIGS. 8A-8D and FIGS. 9A-9D.

Figure 8A:
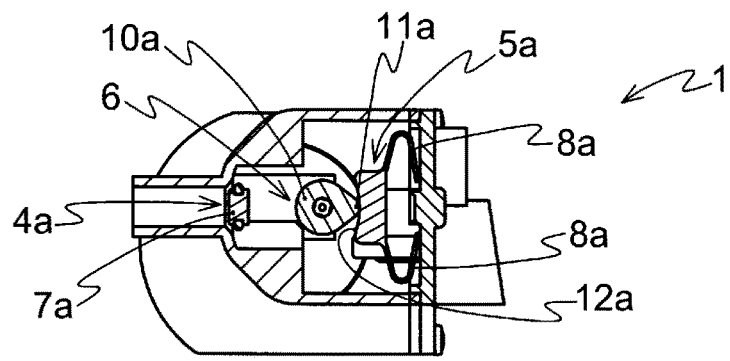
FIG. 8A is a view for explaining a motion of a multi-directional selector valve according to one aspect of the presently disclosed embodiment.
Figure 8B:
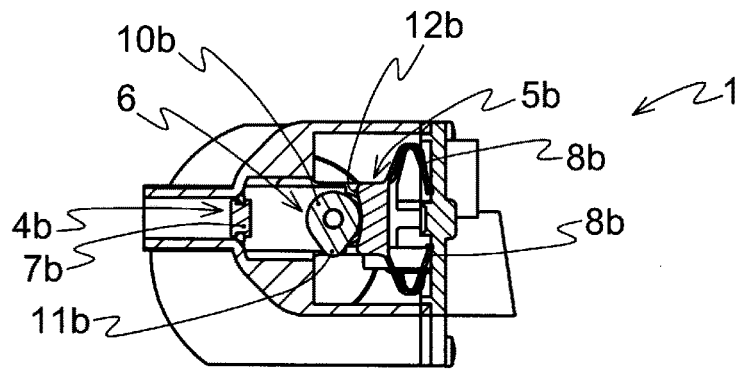
FIG. 8B is a view for explaining a motion of a multi-directional selector valve according to one aspect of the presently disclosed embodiment.
Figure 8C:
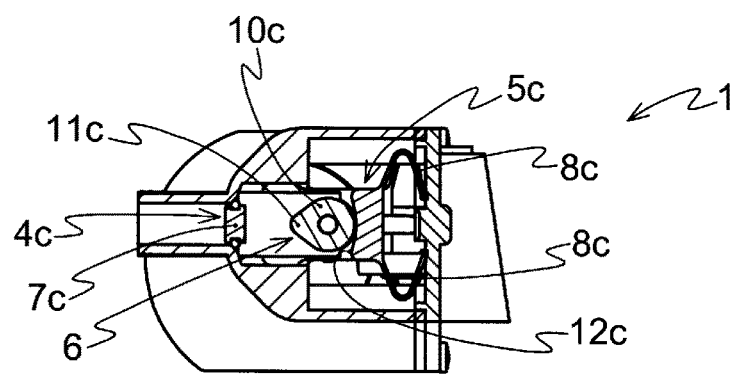
FIG. 8C is a view for explaining a motion of a multi-directional selector valve according to one aspect of the presently disclosed embodiment.
Figure 8D:
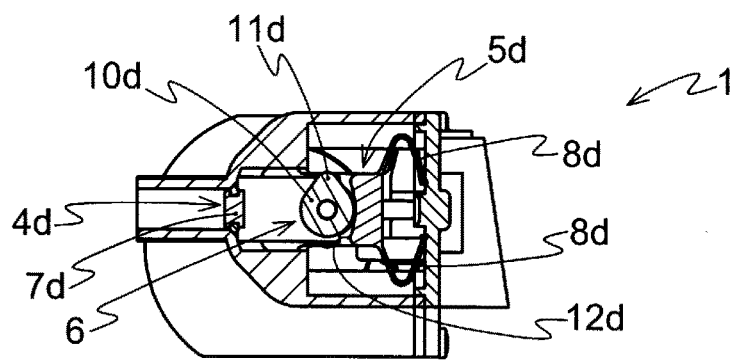
FIG. 8D is a view for explaining a motion of a multi-directional selector valve according to one aspect of the presently disclosed embodiment.

FIGS. 8A-8D represent C-C cross-section, D-D cross section, E-E cross section and F-F cross section, respectively of FIG. 1A. FIGS. 8A-8D shows that the discharge port 4a locating on the C-C cross section of FIG. 1A is in an opened stat and the other discharge ports 4b-4d are in a closed state. Namely, as shown in FIG. 8A, the top portion 11a of the plate cam 10a is directed toward the wall surface 12a side of the valve body 5a at the right side on FIG. 8A, the valve body 5a is pressed toward the opposite side of the discharge port 4a, the blocking portion 7a is separated from the discharge port 4a, and thus the discharge port 4a is brought to an opened state. On the other hand, the top portions 11b-11d of the plate cams 10b-10d shown in FIGS. 8B-8D are directed toward the lower side, left side and upper side, respectively on FIGS. 8B-8D, the valve bodies 5b-5d are not pressed by the plate cams 10b-10d, and the blocking portions 7b-7d are biased by an elastic force generated by the plate springs 8b-8d to close the discharge ports 4b-4d.

Figure 9A:
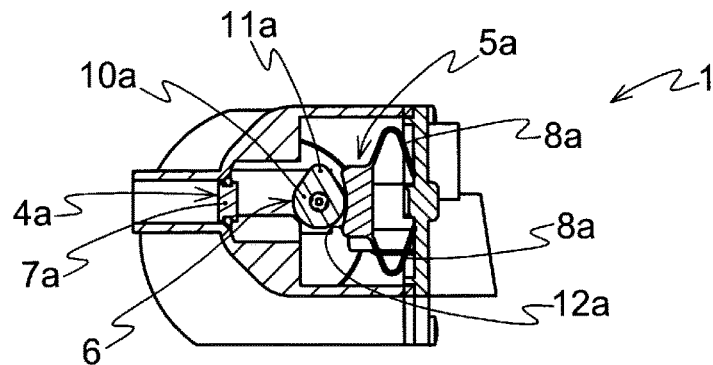
FIG. 9A is a view for explaining a motion of a multi-directional selector valve according to one aspect of the presently disclosed embodiment.
Figure 9B:
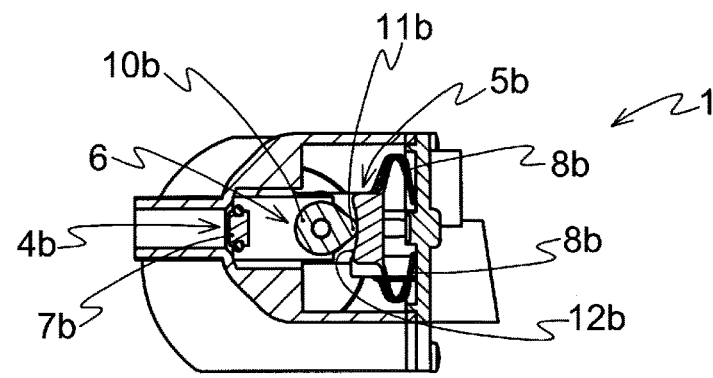
FIG. 9B is a view for explaining a motion of a multi-directional selector valve according to one aspect of the presently disclosed embodiment.
Figure 9C:
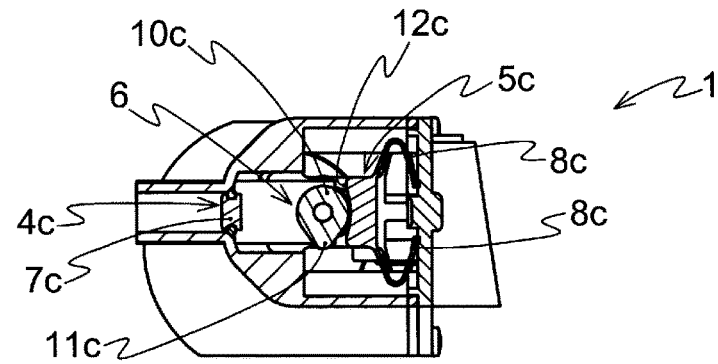
FIG. 9C is a view for explaining a motion of a multi-directional selector valve according to one aspect of the presently disclosed embodiment.
Figure 9D:
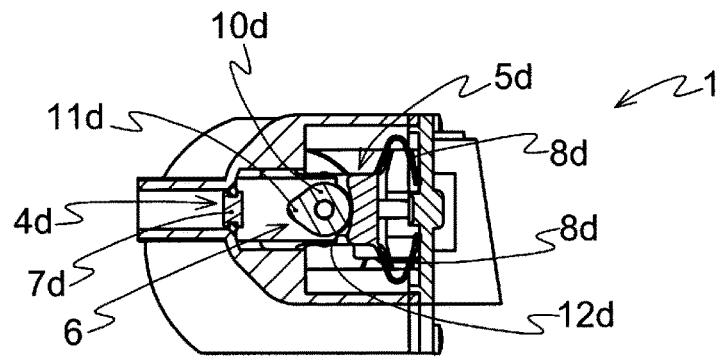
FIG. 9D is a view for explaining a motion of a multi-directional selector valve according to one aspect of the presently disclosed embodiment.

FIGS. 9A-9D show the state of the cam shaft 6 of FIGS. 8A-8D having been rotated counter-clockwise by an angle of 90° each, and FIGS. 9A-9D represent C-C cross-section, D-D cross section, E-E cross section and F-F cross section, respectively of FIG. 1A in the same manner as in FIGS. 8A-8D. In the state shown in FIGS. 9A-9D, the top portion 11b of the plate cam 10b shown in FIG. 9B is directed toward the wall surface 12b side of the valve body 5b, the valve body 5b is pressed toward the opposite side of the discharge port 4b, the blocking portion 7b is separated from the discharge port 4b, and thus the discharge port 4b is in an opened state. On the other hand, the top portions 11a, 11c and 11d of the plate cams 10a, 10c and 10d shown in FIGS. 9A, 9C and 9D are directed toward the upper side, lower side and left side, respectively on FIGS. 9A, 9C and 9D, the valve bodies 5a, 5c and 5d are not pressed by the plate cams 10a, 10c and 10d, and the blocking portions 7a, 7c and 7d are biased by the elastic force generated by the plate springs 8a, 8c and 8d to close the discharge ports 4a, 4c and 4d.

In FIG. 9, by further rotating the cam shaft 6 counter-clockwise by an angle of every 90°, the opening of the discharge ports is changed to the discharge ports 4c and then 4d in order and the other discharge ports are closed.

In this aspect of the presently disclosed embodiment, the discharge ports 4a-4d are arranged on one plane of the second housing 22, and the plate cams 10a-10d are arranged so that the directions of the respective top portions 11a-11d thereof differ at an angle of every 90° in the circumferential direction of the cam shaft 6. However, the arrangement of the plate cams is not limited to such configuration. The discharge ports 4a-4d may be provided on two or more planes of the second housing 22 along the axial direction of the cam shaft 6, and the top portions 11a-11d of the plate cams 10a-10d may be arranged so as to differ from each other at an angle other than 90° in the circumferential direction of the cam shaft 6, or a part or the whole of the top portions 11a-11d of the plate cams 10a-10d may be arranged so as to be directed in the same direction. Such other aspects of the presently disclosed embodiment as mentioned above are explained by means of FIG. 10.

Figure 10:
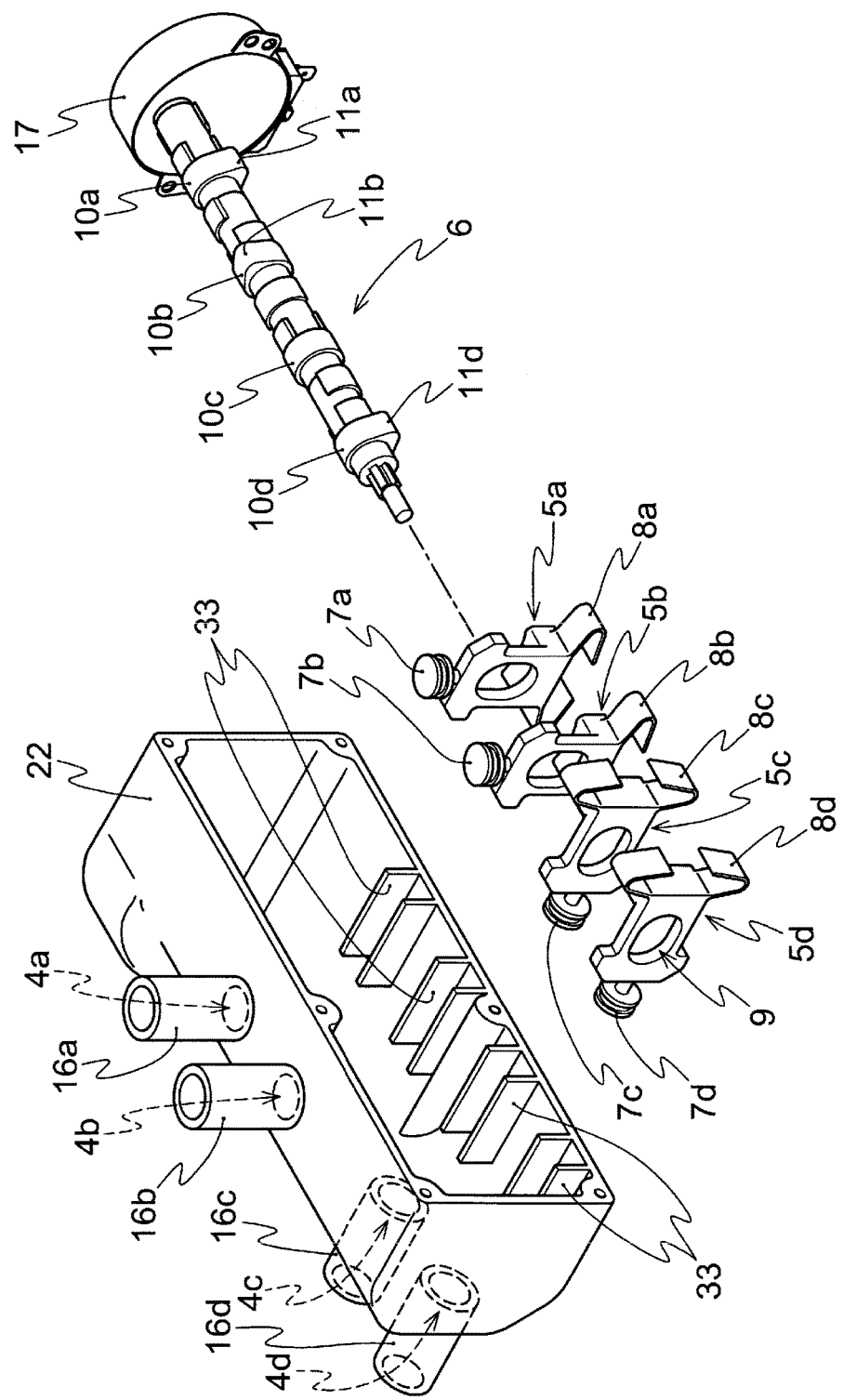
FIG. 10 is a view for explaining a multi-directional selector valve according to other aspects of the presently disclosed embodiment.

As shown in FIG. 10, in the other aspects of the presently disclosed embodiment, the discharge pipes 16a and 16b are provided on one surface (the plane shown in FIG. 1A) of the substantially rectangular parallelepiped second housing 22, and the discharge pipes 16c and 16d are provided on the other surface substantially vertical to the one surface (the front surface shown in FIG. 1B) of the second housing 22. Therefore, similarly with respect to the discharge ports 4a-4d, the discharge ports 4a and 4b are disposed on the one surface of the second housing 22, and the discharge ports 4c and 4d are disposed on the other surface of the second housing 22. The plate cams 10a-10d are disposed on the cam shaft 6 so that the top portion 11b of the plate cam 10b and the top portion 11c of the plate cam 10c (not shown since the top portion 11c is located on the back side of the cam shaft 6 in FIG. 10) face the directions reverse to each other in the circumferential direction of the cam shaft 6 and that the top portion 11a of the plate cam 10a and the top portion 11d of the plate cam 10d face the same direction in the circumferential direction of the cam shaft 6 and face the direction being deviated clockwise by an angle of 90° from the direction of the top portion 11b of the plate cam 10b when viewed from the plate cam 10d side (hereinafter the same when stated simply as clockwise or counter-clockwise). The cam shaft 6 is inserted into the through-holes 9 of the respective valve bodies 5a-5d, and the valve bodies 5a-5d are disposed in the second housing 22 so that the blocking portions 7a-7d face the discharge ports 4a-4d, respectively. Namely the valve bodies 5a and 5b are disposed so that the blocking portions 7a and 7b face the one surface of the second housing 22, and the valve bodies 5c and 5d are disposed so that the blocking portions 7c and 7d face the other surface of the second housing 22. In addition, in this aspect of the presently disclosed embodiment, guide walls 33 for guiding the valve bodies 5a-5d are provided in the second housing 22 instead of providing the guided portions 26 (See FIG. 4A) on the valve bodies 5a-5d.

Next, the switching to the opened or closed state of the discharge ports 4a-4d in this aspect of the presently disclosed embodiment is explained provided that the discharge ports 4a and 4d are configured so as to be opened when the top portions 11a-11d of the plate cams 10a-10d are in a state of facing the plate springs 8a-8d of the valve bodies 5a-5d (See FIGS. 6A and 6B relating to one example of one aspect of the presently disclosed embodiment mentioned above). In the state of the top portion 11a of the plate cam 10a facing toward the plate spring 8a of the valve body 5a, the valve body 5a is pressed onto the plate spring 8a, the blocking portion 7a separates from the discharge port 4a, and thereby the discharge port 4a is in an opened state. On the other hand, when the discharge port 4a is in such a state, the top portion 11b of the plate cam 10b faces the direction deviating clockwise by an angle of 270° from the direction in which the plate spring 8b of the valve body 5b lies in the circumferential direction of the cam shaft 6, the top portion 11c of the plate cam 10c similarly faces the direction deviating clockwise by an angle of 180° from the direction in which the plate spring 8c of the valve body 5c lies, and the top portion 11d of the plate cam 10d similarly faces the direction deviating clockwise by an angle of 90° from the direction in which the plate spring 8b of the valve body 5d lies. Since any of the top portions 11b-11d are not in a state of facing toward the plate springs 8b-8d, respectively of the valve bodies 5b-5d, the discharge ports 4b-4d are closed with the blocking portions 7b-7d biased by the elastic force generated by the plate springs 8b-8d. From this state, when the cam shaft 6 rotates counter-clockwise by an angle of 90°, the top portion 11d of the plate cam 10d is in a state of facing toward the plate spring 8d of the valve body 5d, and therefore, the discharge port 4d is in an opened state. On the other hand, the top portions 11a, 11b and 11c of the plate cams 10a-10c are in a state of facing the directions deviating clockwise by the angles of 270°, 180° and 90°, respectively from the directions in which the corresponding plate springs 8a-8c of the valve bodies 5a-5c lie. Therefore, the discharge ports 4a-4c are closed by the blocking portions 7a-7c biased by the elastic force generated by the plate springs 8a-8c. When the cam shaft rotates further, the discharge port being in an opened state is changed to the discharge port 4c, and then the discharge port 4b, and the other discharge ports are closed.

Even if the discharge ports 4a-4d are provided on different surfaces of the second housing 22 like this aspect of the presently disclosed embodiment, the opening discharge port can be changed in order by properly setting the directions of the top portions 11a-11d of the plate cams 10a-10d. Therefore, the discharge ports may be provided on plural surfaces of the second housing 22 depending on positional relation of the multi-directional selector valve of the presently disclosed embodiment and equipment receiving distributed air and the limitation in the arrangement of air supply pipes to such equipment. Further, the discharge ports 4a-4d may be disposed and the directions of the top portions 11a-11d of the plate cams 10a-10d may be set so that air is discharged to plural destinations simultaneously, namely any of the discharge ports 4a-4d are opened simultaneously.

The multi-directional selector valve of one aspect of the presently disclosed embodiment shown in FIGS. 2A and 2B can be produced easily. First, one shaft part 61 is mounted on the drive source 17, and this shaft part 61 is inserted into the through-hole 9 of the valve body 5a. Thereafter, connection of additional shaft parts 61 to the inserted shaft part and insertion of the connected shaft parts 61 into the valve bodies 5b-5d are repeated alternately. Next, the connected set of the assembled shaft parts 61, namely the cam shaft 6 and the valve bodies 5a-5d as well as the drive source 17 are set on the second housing 22 while guiding the outer peripheries of the valve bodies 5a-5d by means of guiding portions 18 (See FIG. 3A) and guiding portions 20 (See FIG. 3B) provided on the second housing 22, and then the drive source 17 is fixed to the second housing 22 by means of screws or the like. Then by fixing the first housing 21 to the second housing 22 by means of screws or the like, the multi-directional selector valve of this aspect of the presently disclosed embodiment can be completed. In addition, as mentioned above, it is possible that only by fixing the first housing 21 to the second housing 22, the plate springs 8a-8d are compressed, thereby generating an elastic force which biases the blocking portions 7a-7d continually toward the discharge ports 4a-4d side and bringing the discharge ports 4a-4d to a closed state.

As mentioned above, according to the presently disclosed embodiment, the multi-directional selector valve is configured such that the plural valve bodies are pressed by the convex portions provided on the side of the drive body by the rotation of the drive body to open or close the plural discharge ports in order, and therefore, the opening and closing of the plural discharge ports can be controlled by easy operation, namely by rotating the drive body. Also, the suction port and the plural discharge ports are provided in one valve case, and the plural discharge ports are configured so as to be opened or closed only by rotating the drive body.

Therefore, even in the case of a multi-directional selector valve discharging air to many branched destinations, it is not necessary to form branched flow paths between the suction port and the discharge ports and yet no additional drive source is needed, thereby enabling increase in cost and size to be minimized and a failure rate to be decreased. Specifically, by using a structure such that the drive body is inserted into the through-hole of the valve body having the blocking portion at its one end, the discharge ports can be configured so as to be opened or closed by pressing the convex portion of the drive body onto the valve body by the rotation of the drive body to move the blocking portion of the valve body in the direction intersecting the drive body. In such a configuration, the valve body needs not to be fixed to the drive body and the drive body is only inserted into the through-hole of the valve body. Therefore, when the valve body is broken or worn out, the broken valve body can be pulled out from the drive body and can be replaced easily, and a maintenance cost of the multi-directional selector valve can be decreased.

EXPLANATION OF SYMBOLS

1 Multi-directional selector valve
2 Valve case
3 Suction port
4, 4a-4d Discharge ports
5, 5a-5d Valve bodies
6 Cam shaft
7, 7a-7d Blocking portions
8, 8a-8d Plate springs
9 Through-hole
10, 10a-10d Plate cams
11, 11a-11d Top portions of plate cams
12, 12a-12d Wall surfaces
14 Air path
16, 16a-16d Discharge pipes
17 Drive source
21 First housing
22 Second housing
28 Thick portion
61 Shaft part
91 Coil spring

What is claimed is:

1. A multi-directional selector valve comprising:
a valve case provided with a suction port into which a fluid flows and at least two discharge ports from which the fluid flows out, at least two valve bodies for opening or closing the at least two discharge ports, a drive body formed into a rod-like shape and provided for driving the valve bodies and a drive source for rotating the drive body,
wherein the valve bodies and the drive body are disposed in a path of the fluid from the suction port to the discharge port in the valve case, the valve bodies comprise a blocking portion for closing the discharge port, and are configured to open the discharge port with a motion of the blocking portion moving toward the drive body; and
the multi-directional selector valve is configured such that any of convex portions provided on the side of the drive body are pressed onto any of the at least two valve bodies by the rotation of the drive body, thereby opening or closing the at least two valve bodies in order.

2. The multi-directional selector valve of claim 1, wherein the at least two valve bodies are provided along the axial direction of the drive body,
the valve bodies are provided with the blocking portion at one end thereof, an elastic member portion at the other end thereof for generating an elastic force for moving the blocking portion and a main body portion connecting the blocking portion with the elastic member portion and having a through-hole penetrating the valve body in the direction intersecting the direction of movement of the blocking portion moved by the elastic force,
the drive body is inserted into the through-holes of the at least to valve bodies, and
any of the convex portions are pressed onto any of the at least two valve bodies in order by the rotation of the drive body, thereby moving the blocking portion toward the direction intersecting the drive body to open or close the at least two discharge ports in order.

3. The multi-directional selector valve of claim 2, wherein the elastic member portion is configured so as to generate an elastic force for moving the blocking portion to close the discharge port, and the blocking portion is configured so as to separate from the discharge port by pressing the convex portion onto the valve body, thereby opening the discharge port.

4. The multi-directional selector valve of claim 2, wherein a wall surface at least having a portion facing toward the same direction as the moving direction of the blocking portion moved by the elastic force or toward a direction at a sharp angle to the moving direction is formed on a part of the valve body, and a plate cam having a top portion formed being protruded on its outer periphery is provided on the drive body and the top portion is provided as a convex portion of the drive body, and the top portion of the plate cam is pressed onto the wall surface at a predetermined rotation angle of the drive body.

5. The multi-directional selector valve of claim 2, wherein the elastic member portion includes a pair of plate springs having a cross-section in a doglegged form, and the ends of the pair of plate springs opposite the blocking portion is supported on the inner wall of the valve case.

6. The multi-directional selector valve of claim 2, wherein the elastic member portion includes a coil spring, and one end of the coil spring is supported on the inner wall of the valve case and the other end of the coil spring is supported on the other end side of the valve body.

7. The multi-directional selector valve of claim 1, wherein the at least two discharge ports are arranged along the axial direction of the drive body on one surface of the valve case, and the convex portions are arranged facing toward different directions in the circumferential direction of the drive body.

8. The multi-directional selector valve of claim 1, wherein the convex portions are formed integrally with the drive body and the drive body is configured so as to be formed by connecting two or more component parts being connectable and separable to and from each other.

9. The multi-directional selector valve of claim 1, wherein an air pump is connected to the suction port and the at least two discharge ports are connected to a septic tank.

* * * * *